United States Patent
Snell et al.

(10) Patent No.: US 6,497,070 B1
(45) Date of Patent: *Dec. 24, 2002

(54) PEST CONTROL SYSTEM INCLUDING COMPARTMENTS HAVING AREAS FOR RECEIVING PEST CONTROL MATERIALS OF DIFFERING PHYSICAL CONSISTENCIES

(75) Inventors: Eric J. Snell, Hatfield; Bruce C. Yeagle, Sr., Langhorne, both of PA (US)

(73) Assignee: B&G Equipment Company, Plumsteadville, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/695,771

(22) Filed: Oct. 25, 2000

Related U.S. Application Data

(63) Continuation of application No. 09/146,210, filed on Sep. 2, 1998, now Pat. No. 6,164,010.

(51) Int. Cl.[7] .............................................. A01M 1/20
(52) U.S. Cl. ...................................................... 43/131
(58) Field of Search .......................... 43/114, 121, 131, 43/132.1

(56) References Cited

U.S. PATENT DOCUMENTS

| 790,876 | A | | 5/1905 | Andrus |
|---|---|---|---|---|
| 794,323 | A | | 7/1905 | Small |
| 1,321,360 | A | | 11/1919 | Bright |
| 1,493,132 | A | | 5/1924 | Strong |
| 1,964,611 | A | * | 6/1934 | Watson ........................ 43/131 |
| 2,825,996 | A | | 3/1958 | Grant |
| 2,893,160 | A | | 7/1959 | Grant |
| 2,962,836 | A | | 12/1960 | Hughes |
| 3,303,599 | A | | 2/1967 | Ballard |
| 3,427,743 | A | | 2/1969 | Brunner et al. |
| 3,965,609 | A | * | 6/1976 | Jordan ......................... 43/131 |
| 4,065,872 | A | | 1/1978 | Patton et al. |
| 4,228,613 | A | | 10/1980 | Kalnasy et al. |
| 4,316,344 | A | * | 2/1982 | Carlsen ........................ 43/114 |
| 4,485,582 | A | | 12/1984 | Morris |
| 4,619,071 | A | | 10/1986 | Willis |
| 4,825,581 | A | | 5/1989 | Dailey |

(List continued on next page.)

OTHER PUBLICATIONS

Termatrol Pro. 1998 Product Guide and Sales Information.
Tin Cat Update. Product Update Information, Aug. 15, 1998.
Advertisement for Stick–All® Mouse and Insect Trap, Kness Mfg. Co., Inc., Hwy. 5 South, P.O. Box 70, Albia, IA 52531, Pest Control, p. 52 (May 1998).

*Primary Examiner*—Charles T. Jordan
*Assistant Examiner*—Jordan M Lofdahl
(74) *Attorney, Agent, or Firm*—Duane Morris LLP

(57) ABSTRACT

A modular pest control system which includes structure that is specifically designed to capitalize upon the physiology and/or behavior of a wide assortment of pests to render the system more attractive to the pests. The system is modular in nature whereby it may be configured as desired or necessary to target any combination of one or more species of pests. The modular system preferably includes, at minimum, a first component in the form of a pest control device that may be releasably connectable to a second component. The first component may contain one or more materials or structural features for controlling any individual species or combinations of species of ground crawling pests, termites and rodents. The second component may be a releasable base for securing the first component to vegetation, building surfaces and materials, or targeted areas of soil. Alternatively, the second component itself may be a pest control device that may be releasably connectable to the first component and which anchors the first component to the earth.

23 Claims, 27 Drawing Sheets

U.S. PATENT DOCUMENTS

| | | |
|---|---|---|
| 4,905,407 A | 3/1990 | Sherman |
| 5,040,327 A | 8/1991 | Stack et al. |
| 5,042,192 A | 8/1991 | Osteen |
| 5,136,803 A | 8/1992 | Sykes et al. |
| 5,148,626 A | 9/1992 | Haake, Sr. |
| 5,152,097 A | 10/1992 | Rhodes |
| 5,398,442 A * | 3/1995 | Musket ........................ 43/114 |
| 5,448,852 A | 9/1995 | Spragins et al. |
| 5,588,249 A | 12/1996 | Flinner |
| 5,588,250 A | 12/1996 | Chiba et al. |
| 5,673,509 A | 10/1997 | Gatewood, Jr. |
| 5,695,776 A | 12/1997 | Ballard et al. |
| 5,771,628 A | 6/1998 | Nobbs |
| 5,930,944 A | 8/1999 | Knuppel |
| 5,966,863 A * | 10/1999 | Payton et al. .................. 43/131 |
| 6,158,166 A * | 12/2000 | Snell et al. .................... 43/131 |
| 6,164,010 A * | 12/2000 | Snell et al. .................... 43/131 |
| 5,038,516 A1 | 8/2001 | Doucette .................... 043/131 |

\* cited by examiner

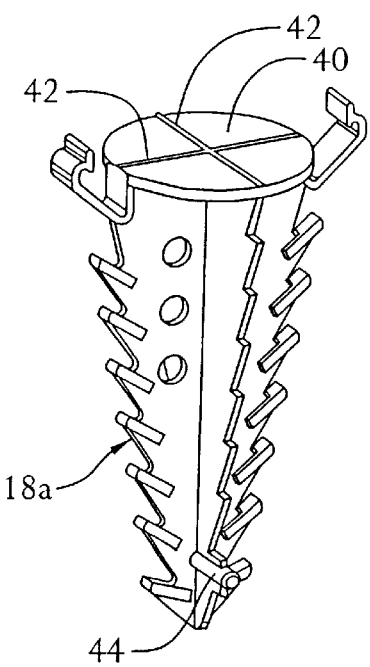
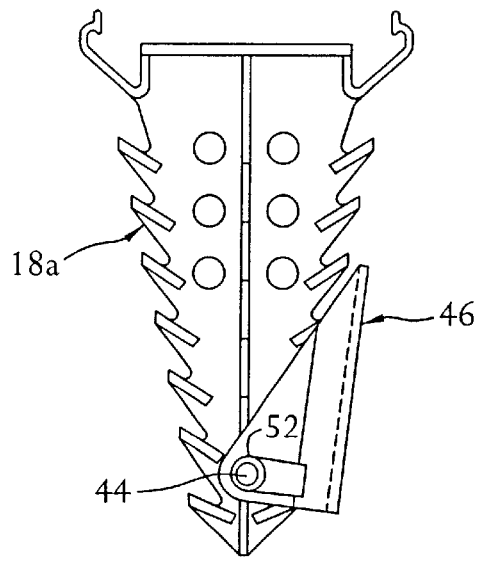
FIG. 2  FIG. 6
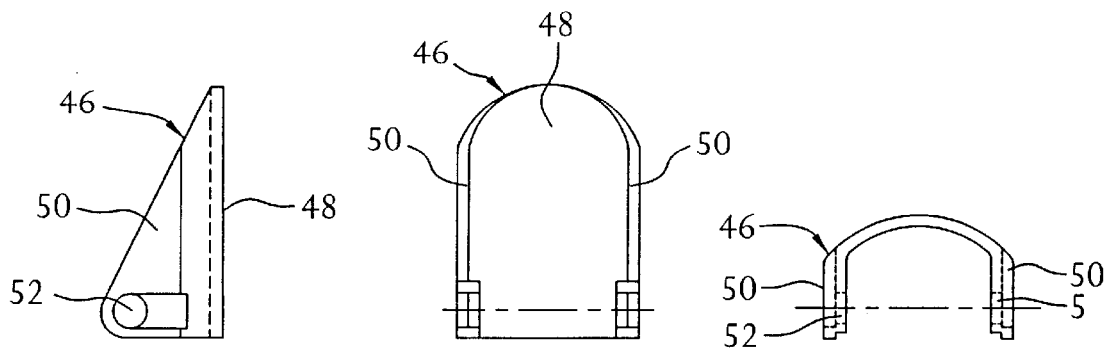
FIG. 3  FIG. 4  FIG. 5

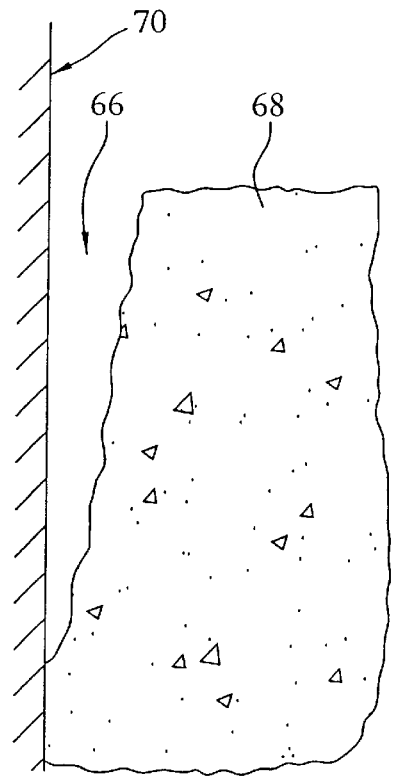
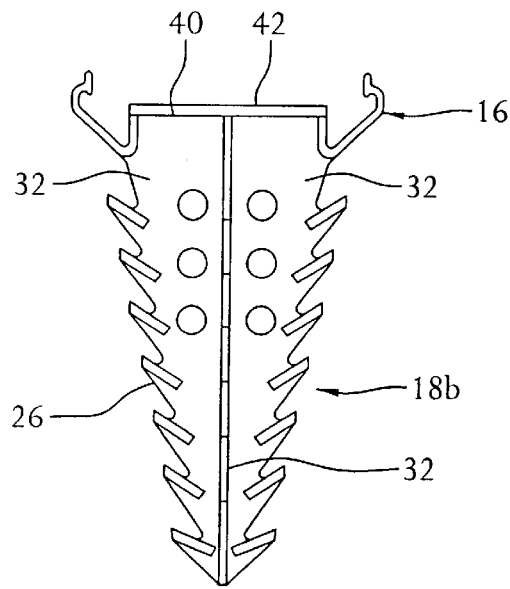
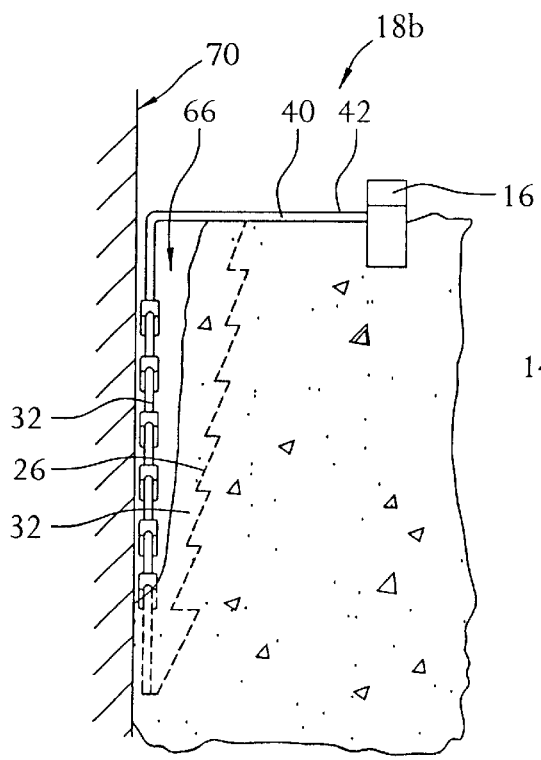
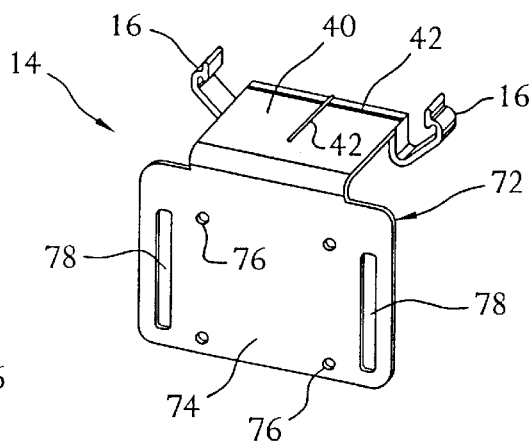
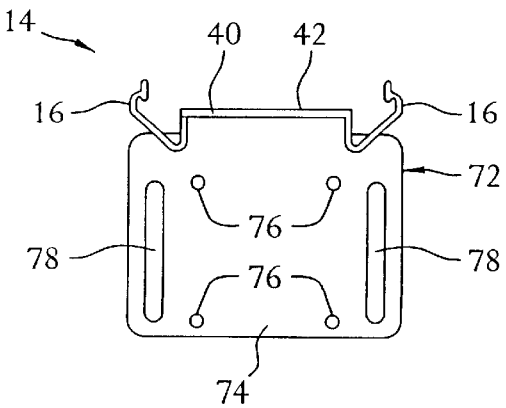
FIG. 8
FIG. 9
FIG. 10
FIG. 11
FIG. 12

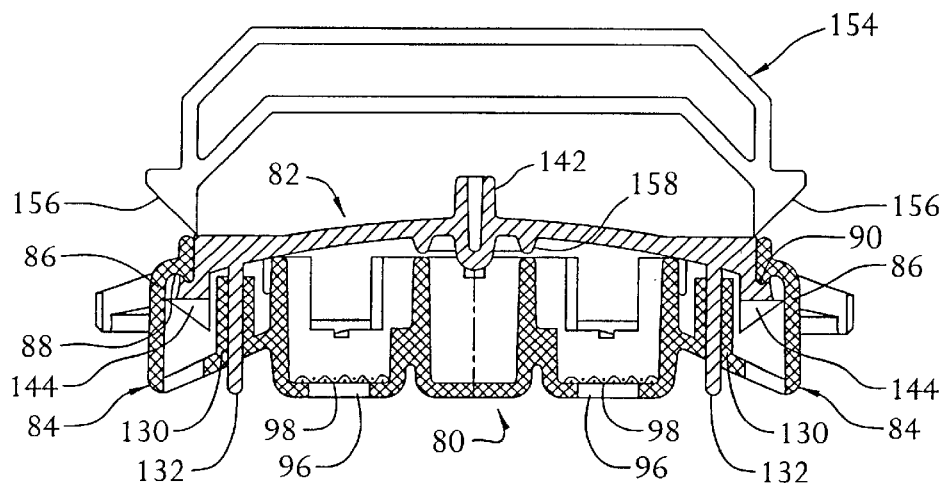
FIG. 21
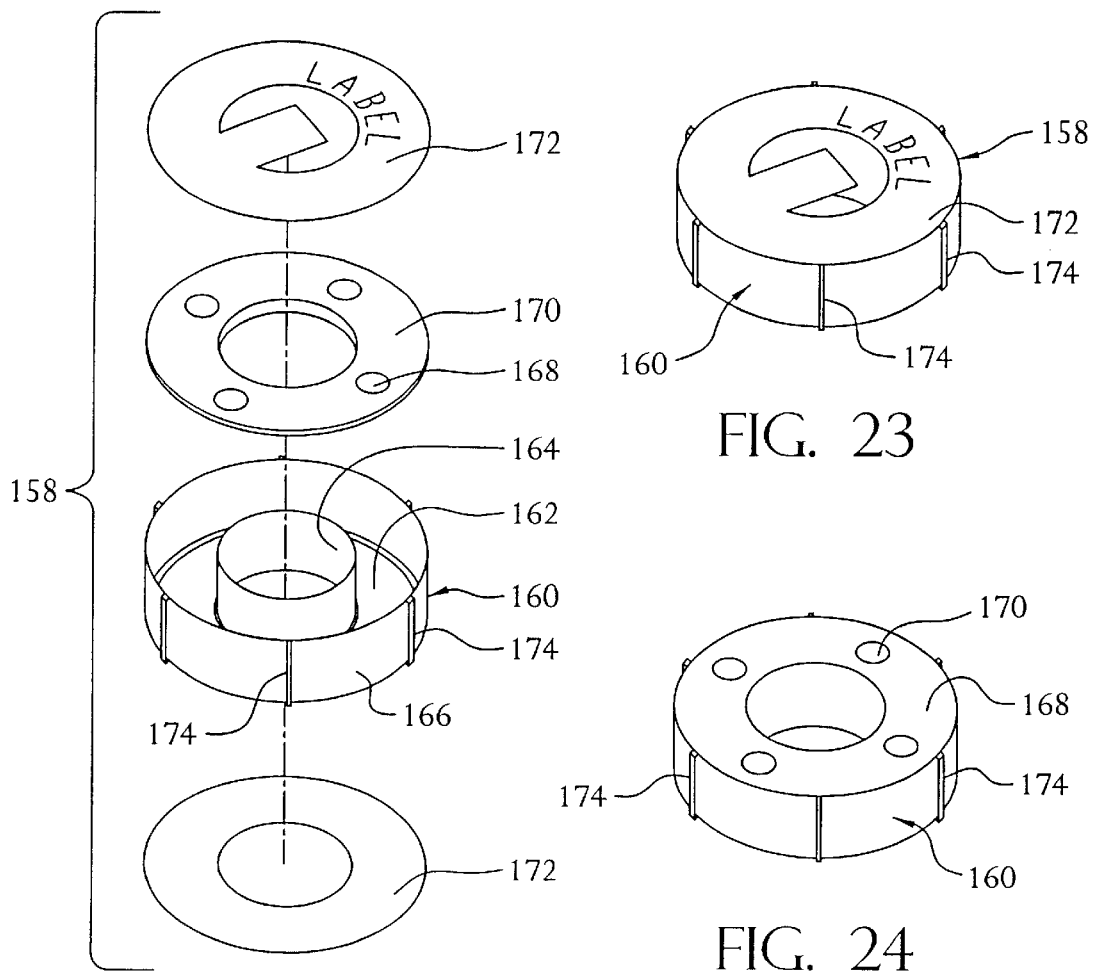
FIG. 23
FIG. 24
FIG. 22

PEST CONTROL SYSTEM INCLUDING COMPARTMENTS HAVING AREAS FOR RECEIVING PEST CONTROL MATERIALS OF DIFFERING PHYSICAL CONSISTENCIES

Cross-Reference to Related Applications

This application is a continuation of Ser. No. 09/146,210 filed Sep. 2, 1998, Pat. No. 6,164,010.

This application is related to U.S. application Ser. No. 09/145,904 filed Sep. 2, 1998, entitled MODULAR PEST CONTROL SYSTEM.

FIELD OF THE INVENTION

The present invention relates in general to pest control systems and in particular to a modular pest control systems for controlling one or more species of pests.

BACKGROUND OF THE INVENTION

A variety of systems have been produced for controlling pest populations in and around residential and commercial structures. Included among the many pests typically targeted by such systems are crawling insects, flying insects, millipedes, centipedes, slugs, crickets, grasshoppers, termites and rodents. Many involve the use of repellents or baits which may be fatal to certain species of insect pests or rodent pests, for example. Beyond the use of known attractants such as desirable baits (e.g., foods or pheromones), existing pest control system designs generally do not demonstrate thoughtful cognizance of and do not capitalize on pest behavior and/or physiology in order to render the systems particularly attractive and, therefore, especially lethal to the pests they are intended to control. With baits functioning essentially as the sole attractant, the success of these systems depends in great measure upon their placement and accessibility. Hence, if the system is not disposed, often serendipitously, relatively close to the target pest population or is not constructed for ready access by the pests, the effectiveness of the system may be considerably less than desired.

Moreover, other than pheromone or specific food bait designs, existing pest control systems rather indiscriminately attract and harm all species of pests, including desirable and undesirable species, that happen upon the traps and are capable of accessing the bait. And it is not believed that any existing systems can be initially configured to accommodate one or more species of pests and then reconfigured to exclude certain of those species from all or a portion of the trap. Additionally, existing systems are not constructed such that one portion of the system is dedicated to the control of one species of pest, e.g., ants, and other portion(s) of the system are dedicated to the control of other species of pests, e.g., termites, rodents, etc.

Still further, existing systems have essentially immutable constructions. That is, they are not modular and cannot be assembled and installed at a desired location to achieve highly selective species control, e.g., above ground ant control coupled with below ground termite control, above ground rodent control coupled with below ground termite control, above ground ant and/or rodent control coupled with above or below ground termite control, or the like.

U.S. Pat Nos. 5,042,192 and 5,148,626, for example, disclose above ground, upright, shaft-like supports for foodstuffs, furniture and pet feeding bowls, among other things, which incorporate an insect repellant barrier for preventing crawling insects from reaching the top of the supports. To further frustrate invasion by crawling insects, the shafts of the supports are disclosed as being preferably formed of slick material for hindering the insects from obtaining firm footing thereon. Devices such as these are site-specific deterrents to certain species of insects but are essentially ineffective for insect or other pest control.

U.S. Pat. No. 3,303,599 describes various embodiments of insect traps which can be either mounted on a stake or garbage can cover or suspended from a support such as a tree, rail, rafter or the like. The trap includes, inter alia, a water container and wicking means for conveying water from the water container to poison contained in another area of the trap in order to keep the poison moist. The trap is provided with no structure which renders it especially inviting to particular species of pests and is not equipped with structure for selectively targeting certain species for pest control.

U.S. Pat. No. 5,695,776 discloses an above or below ground termite trap including grooved wooden termite baits impregnated with poison.

U.S. Pat. Nos. 2,825,996, 2,893,160 and 4,065,872 disclose insecticide containers supported by corrugated stakes which are insertable into the ground or mountable to a support structure such as a wall or the like. Among their ascribed functions, the stake corrugations are provided to permit insects to gain access to the insecticide containers. Of these patents, U.S. Pat. No. 2,893,160 further comprises a child/pet shield for covering the insecticide container. The shield includes a roughened outer surface created by a plurality of apertures which are punched through the shield. The patent asserts, without explanation, that ants and other insects are attracted to the unit since numerous insects like to crawl in and about roughened apertured surfaces.

U.S. Pat. No. 4,485,582 describes an insect feeding station including a cover permanently affixed to a base which supports a poisonous bait compartment. The base may include a tubular extension which may be thrust into the earth. Insects may enter the bait compartment through the tubular extension and openings provided in the cover. The station provides no structure for encouraging insects to be drawn thereto. It also has no means for restricting access to the bait to certain species nor it is modular to permit selective configuration and reconfiguration to target desired species.

U.S. Pat. No. 3,427,743 provides a circular insect bait dispenser which is secured to the ground by a stake. The dispenser includes an inverted bowl-shaped, circular cover which is releasably connected to a circular base. The base may include several compartments which may accommodate several different types of bait for different insects or different types of bait for the same insect. Like the bait station disclosed in U.S. Pat. No. 4,485,582, the dispenser has no structure especially designed to attract insects. It also has no means for restricting access to the bait to certain species. And, it is not modular and therefore, cannot be configured in one way to control certain species of pests and then reconfigured to target other desired species.

A need exists, therefore, for a pest control system which includes structure specifically designed to capitalize upon the physiology and/or behavior or pests to render the system more attractive to the pests.

A further need exists for a pest control system which is modular in nature to permit the system to be configured and reconfigured to selectively target any combination of one or more species of pests.

A further advantage exists for a pest control system including means for restricting access to all or a portion of the baited areas of the system to selected species of pests.

SUMMARY OF THE INVENTION

The present invention provides a modular pest control system which includes structure that is specifically designed to capitalize upon the physiology and/or behavior of a wide assortment of pests to render the system more attractive to the pests. The system is modular in nature whereby it may be configured as desired or necessary to target any combination of one or more species of pests.

The modular system preferably includes, at minimum, a first component in the form of a pest control device that may be releasably connectable to a second component. The first component may contain one or more materials or structural features for controlling any individual species or combinations of species of ground crawling pests, termites and rodents.

The second component may be a releasable base for securing the first component to vegetation, building surfaces and materials, or targeted areas of soil. Alternatively, the second component itself may be a pest control device that may be releasably connectable to the first component and which anchors the first component to the earth.

Each of the components also preferably includes numerous additional structural features, which further enhance the performance of the system.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein;

FIG. 2 is a perspective view of a soil anchor component of the modular pest control system according to the present invention;

FIG. 3 is a side elevation view of a toggle member suitable for use with the soil anchor of FIG. 2;

FIG. 4 is an inside elevation view of the toggle member of FIG. 3;

FIG. 5 is a top plan view of the toggle member of FIG. 3;

FIG. 6 is an elevation view of the soil anchor of FIG. 2 with the toggle member of FIG. 3 pivotally attached thereto;

FIG. 8 is a side elevation view of a gap formed between dry soil and a building foundation;

FIG. 9 is a front elevation view of a soil anchor according to the present invention which is suitable for insertion into a gap formed between dry soil and a building foundation;

FIG. 10 is a side elevation view of the soil anchor of FIG. 9 disposed in a gap formed between dry soil and a building foundation;

FIG. 11 is a perspective view of a mounting bracket component of the modular pest control system according to the present invention;

FIG. 12 is a front elevation view of the mounting bracket of FIG. 11;

FIG. 21 is an elevational cross-section view of the base portion of FIG. 13 and the cover portion of FIG. 17 in assembled condition, as well as a side elevation view of a tool for facilitating release of the cover portion from the base portion;

FIG. 22 is an exploded view of a pest bait receptacle suitable for receipt in the base portion of FIG. 13;

FIG. 23 is a perspective view of the pest bait receptacle of FIG. 22 in assembled condition;

FIG. 24 is a perspective view of the pest bait receptacle of FIG. 22 with a label thereof removed to expose openings through which pests may gain access to the interior of the receptacle;

DETAILED DESCRIPTION OF THE INVENTION

Figure 1:
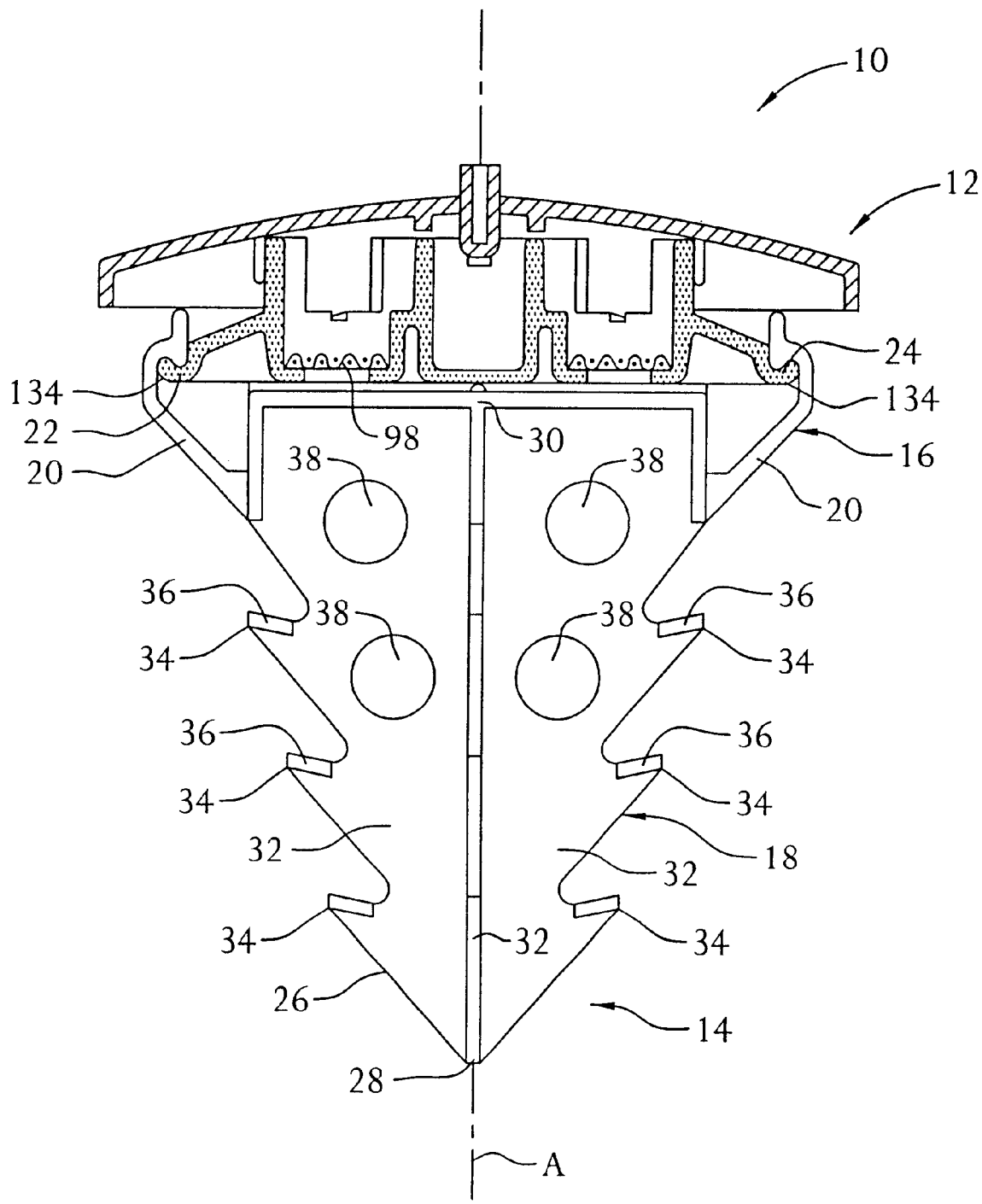
FIG. 1 is a side elevation view, in partial section, of a first embodiment of a modular pest control system according to the present invention.

The several components of the modular pest control system of the present invention are designed, inter alia, to address the behavioral preferences and tendencies, particularly movement behavior, and the physiological needs of multiple commonly encountered pests in order to control a broad variety of pest populations.

Pest Movement Attractants

Almost all pests have natural tendencies or senses that dictate how they move through their environment. Rarely in the design of known pest control systems, however, is more than casual attention devoted to pests' locomotive traits as behavioral characteristics to be capitalized upon in the design of the system in order to enhance system performance. Many general and specific pest movements for which pest attraction/control structure may be designed can be classified as follows:

Edge-Of-Wall Effect: This is perhaps the most common movement behavior of pests in general. Ants, rodents, crickets, cockroaches, millipedes, ground beetles and many other ground crawling pests travel along the bases of walls or similar wall/ground or wall/floor intersections. This behavior is manifested by many pests because of their apparent desire to place one antenna or whisker on the wall or upright surface while placing the other on the ground or similar traveling surface. It may be observed at the juncture, in any plane, of substantially orthogonally disposed surfaces such as wall/floor and wall/ceiling junctures and can be exploited by designing pest control equipment that fits as closely as possible to the face of a wall. In addition, natural voids or gaps are formed at the bases of exterior walls when soil dries, contracts, and separates from the structure's foundation. This phenomenon creates an excellent traveling juncture for many pests such as ants. When designing pest control equipment, therefore, the equipment should be such that it remains close to the foundation and preferably projects into the void to intercept trailing and nesting pests. Pest control system performance can be further enhanced by simulating the edge-of-wall effect at the outer peripheral regions of the station which would function as a structural attractant.

Corner Effect: This is an extension of the edge-of-wall effect because walls or similar surfaces typically eventually lead to a corner (outer or inner). Corners are more likely to have higher pest activity because they represent the juncture of three usually mutually orthogonal planes. Purposefully designing pest control equipment to fit closely into corners, therefore, would promote higher pest activity in and around the equipment.

Groove Effect: The groove found between two rows of bricks, slabs and the like creates a natural pathway for small crawling pests such as ants. Explanation of this behavior can be designed into pest control equipment by making grooves that are too small to be attractive for pests other than ants so that ants can be attracted, for example, to a different compartment in a pest control station than compartments designed for other pests. The groove effect can also be used to lure pests into the equipment and reduce the likelihood of pests trailing around the outside of the equipment and missing the toxicant or other pest control means contained in the equipment.

Outer Edge Effect: Ants are one of the few common pests that follow outer edges of structures, e.g., the outer edge on the top of a shelf or a vertical edge up the outer corner of a wall. This is another movement behavior that can be accommodated by incorporating outer edge type structure into pest control equipment to attract ants to desired areas in the equipment.

Ridge Effect: A raised ridge on a flat surface will direct many randomly foraging pests from one direction to another. This behavioral tendency can be used to direct pests such as ants from one area of a pest control device to another area where ant-specific baits may be located. This feature can help prevent certain pests from entering a pest control device and exiting the device without finding the toxicants or other pest control means contained therein. That is, without such ridges certain pests may enter and exit the device without encountering the pest control agents.

Cable Effect: Ants, cockroaches, and certain other ground crawling pests also tend to travel along the upper surfaces of cables, wires, water hoses, pipes and other elongate, rounded members. This is a common way for pests to enter a structure or quickly trail across a topographically complicated area such as a yard. This trait can be exploited by designing pest control equipment which can be mounted to elongate substantially cylindrical members that are already in place around a structure (e.g., cable TV wires, water hoses, water pipes, etc.). Similarly, disposing rods, wires, cables, or similar substantially cylindrical members to project from a pest control device in order to attract pests into the device would represent another way of capitalizing upon this particular behavioral pattern.

Harborage or Refuge Effect: When pests such as rodents and ground crawling pests, e.g., cockroaches, crickets, ground beetles, centipedes, etc. first enter into a new area (such as when carried indoors with stored products or when they crawl under an exterior door), they quickly seek shelter. The basic need to forage into new areas is driven by the search for food. However, when faced with new surroundings, most pests initially seek protection by following closely along edges of walls until finding a suitable hiding site. Once secure in the new harborage they will resume the search for food. Because of many pests' tendency to find protection rapidly, it is possible to design equipment that provides an attractive "false harborage", described in greater detail hereinafter, which can be placed at key locations where pests first enter a structure. For instance, rodents, crickets and ground beetles usually enter under doorways. Thus, equipment should be designed to intercept such pests just inside of doorways/garage doors. German cockroaches and other pests, however, may first enter a grocery or restaurant when carried in with infested boxes of supplies. These pests can be intercepted by designing equipment that can be properly positioned at the top of baseboards or at the bases of shelving legs.

Upward Movement Effect: Some pests such as cockroaches can readily crawl on vertical surfaces and have a natural tendency to crawl upwards in search of harborages or food. This habit can be targeted with equipment designs by incorporating features that allow placement onto vertical surfaces and, particularly, vertical corners. Such equipment may include a false harborage, a tacky-surfaced trap known as a glueboard or a poisonous bait.

Downward Wall Movement and Baseboard Tracking Effect: When German cockroaches and other pests are first introduced into a new environment (e.g., in an infested box carried into a storage room in a restaurant), they have two options of leaving the infested box and finding other food and harborage sources. The first is to climb onto the wall and the second is to climb down the legs of the storage shelving. If a box is touching a wall, cockroaches' first tendency is to move upward. If the storage area is cluttered so as to interfere with air flow and light transmission, the cockroaches may crawl to the ceiling line and move to the corner. However, in many cases, there is too much air movement and light whereby, when moving upward on the exposed wall, the cockroaches will go back down the wall toward less air and less light. Upon turning downward, the first straight edge a cockroach will normally encounter is the top of the baseboard. Their tendency is then to follow the top of the baseboard which will lead to either a corner of a room or a door frame. One of the most important pest control equipment design features for preventing introduced cockroaches and other pests from becoming established indoors is the capability for attachment to the top of a baseboard. Pest control equipment placed at the top of the baseboard should therefore serve multiple purposes including attracting pests with a false harborage, baiting the pests to kill them, and/or trapping some pests with glueboards as a monitor the extent of infestation of newly released pests.

Upward or Downward Equipment Tracking Effect: Many of the harborage locations for German cockroaches within a structure such as a residence, grocery or a commercial restaurant are associated with sinks, appliances, and shelving, as well as the frames and legs of such equipment. This provides the ability to predict the movement of cockroaches within such environments. The pests must leave these harborages in search of food using one or two routes: up or down a wall, as described above, or down the legs of the equipment. As noted, pest control devices may be designed for placement at the corners on top of baseboards which can intercept those pests moving down the wall. Still other pest control systems may surround the base of equipment legging with glueboards, false harborages, baiting and/or treatment devices. The present invention therefore also contemplates pest control devices that may surround equipment legging to prevent upward movement of cockroaches and other pests.

Pest Physiology Attractants

According to the present invention, structural provision for pheromones, food, water and other attractants can also be incorporated into the design of pest control equipment to better enhance the effectiveness of traps and toxicants contained within the equipment. Air flow over such attractants is important since the 'smell' is transmitted by air movement. Equipment can be designed to maximize air flow over the attractant from all areas or in a particular direction (dependent on station position). Accordingly, structural provision for pheromonal and related scent-based attractants may be included into pest control equipment designs to entice specific pests to one or more specific area(s) within the equipment. If a unit incorporates more than one pest control feature (such as ant baiting area and a glueboard area), it may be desirable to attract a certain species of pest into all chambers or only one chamber and not others. For instance, if one wishes to monitor a pest population infesting stored products such as dry pet foods, an appropriate pest pheromone must be placed directly over or on a glueboard. Otherwise, few if any pheromonally-attracted pests may become stuck to the glueboard thereby suggesting that the infestation is light. That is, the pests will be attracted to the exact area where the pheromone is located and avoid being caught in the glueboard.

Ideal Harborage Factors

All pests have particular requirements for an ideal harborage site which can be incorporated into pest control system equipment design. Such aspects can be included into the designs of dedicated "false harborage" components or supplemental attractant features of other dedicated components. Indeed, appreciation of a combination of factors is critical to replicating a good harborage for a particular pest. Included among the factors that add to the attractiveness of a site as a harborage include adequate moisture, shelter from excess water and proper void size.

Adequate Moisture: Adequate moisture is one of the most important factors for providing a good harborage for ants and many other species of pests. It is imperative for most pests, however, that the moisture only manifest itself as high humidity and not as actual standing or pooling water. In warm environments, the combination of water and heat in a harborage creates a "sauna effect" ideal for many pests such as ants.

Designing equipment with a small area for water to pool or collect and then evaporate with heat will increase the humidity and attractiveness of an equipment design. Equipment designed to be placed near a water source such as a downspout is another way to make equipment more attractive since pests frequently nest under or near downspouts.

Shelter From Excess Water: Protection from excess rain, sprinklers or downspouts is critical to an ideal harborage or station design because the nest might be washed away and destroyed. Most pests seem to sense the ability of a potential harborage to keep excess water out and are attracted to those which suitably shield the pest from excess water.

Proper Void Size: Suitably sized openings, voids, or cavities in a protected area are critical to attracting certain pest species. For example, thigmotrophic pests need to feel their backs touch the interior surface of a structural void in order to find the void attractive as a harborage. Other pests prefer to excavate out a shallow amount of dirt under a flat surface to make room for a nest. Equipment can be designed to incorporate the desired void size(s) and/or configuration(s) attract one or more species of pest(s).

Termite Biology Factors

Termites have a variety of biological factors which can affect pest control equipment design. Some factors can be incorporated in order to make a station more attractive and therefore easier for termites to find. Other factors can affect, for example, how a termite monitoring material can best be inspected without disturbing the termites and having them vacate the monitoring station which might otherwise istort the monitoring process. These two categories, factors affecting the attractiveness of a termite control device, and termites' desire to remain in a control device are discussed below:

Factors Affecting the Attractiveness of a Termite Control Device

Trackways: When subterranean termite species create foraging tunnels and encounter structures which present trackways, the termite tend to follow such structures. This behavior can be exploited in the design of termite control equipment by attaching rods or similar elongate members to the side or bottom of a termite station which preferably radiate out from the station in all directions. Such structure would tend to attract termites from a distance to the station.

Water: Water or high moisture can be sensed by termites from limited distances. Incorporating water chambers or cavities into the design of a termite station can add to the station's attractiveness. Water receptacles can be made to be refilled with each service or designed to naturally trap rain and/or sprinkler water. Stations can also be designed to attract water to the general area to increase ground moisture around the trap. Designs are also contemplated to render pest control stations more readily installable near downspouts where the soil moisture is higher but which also keep excess surface water out of the stations.

Food/Tunneling Materials/Inserts: Termites are attracted to insulative and nutritive materials as habitats. As such, termites generally prefer tunneling through soft wood and other substantially rigid, yet relatively soft materials. With this in mind, termite control equipment may be designed to effectively incorporate one of both of soft woods and other such termite attractant materials. Rigid foam materials such as styrofoam and the like are attractive to termites as insulative habitats and therefore are useful as termite attractants. However, they are not actual food sources and may be used in conjunction with natural wood products to produce a composite product which is especially attractive to termites. Moisture can be used as an added attractant by allowing a wood attractant to contact the soil thereby absorbing water from the ground. Additional blocks of wood or rigid foam can also be provided and prevented from touching the soil in order to limit the overall rate and extent of wood rot and render the moistened block more attractive with greater termite activity. The moisture content of foam materials may be enhanced by including preformed holes or receptacles into the foam that can be refilled or capture ground water whereby water would function as an added attractant to the foam, particularly in dry climates.

Ground Shadows: Subterranean termites are attracted to so-called "shadows" of large surface area objects on the ground surface. Such objects (such as a large rock on the ground) can be perceived as both a natural protector from rain water and a natural humidity chamber where moderate levels of ground water may condense. This can be exploited from a pest control system equipment design perspective by making a termite monitoring/control devices that are large and flat and adopted for placement on the ground surface. Ports may also be provided inside the station that can be filled from above with water and gradually release the water into the ground below the station to draw pests to the station.

Ground Level Foraging: Some species of subterranean termites may prefer to forage close to the ground level (i.e., at the top 0–6 inches of soil). This behavior can be exploited by equipment that has access ports relatively close to the ground level but not so close to allow surface water from running into the station. Additionally, a trackway such as a long tube or rod attached to the station may be inserted down into the ground to lead the termites into the bottom of a station.

Factors Affecting Termites' Desire to Remain in a Control Device

If subterranean termites are disturbed after they enter a monitoring station, they may leave the food/tunneling source and not return thereby compromising the accuracy of the monitoring test. Many factors can deter termites from continuing to feed and tunnel in a given monitor or bait/toxicant source. Many of these factors can be lessened by proper equipment design as discussed below.

One of the primary problems that can sufficiently disturb termites to cause them to leave a monitoring site is the removal of the feeding/tunneling source for routine inspections. With this in mind, equipment can be designed that makes the feeding/tunneling source easier to inspect while minimizing disturbance of the station. According to the invention, some methods to ease inspection include the following:

Multiple Blocks of Food/Tunneling Sources: Two or more blocks of wood and/or foam can be placed inside a station. If placed vertically into the ground, the blocks are separable from one another and placed upright end-to-end. In subterranean stations, the bottom block may be allowed to project through the station and contact the soil. This increases the wood moisture of the bottom block. The increased wood moisture of the bottom block will increase the amount of termite activity therein. Therefore, the top block can be removed for closer inspection without disturbing the primary termite activity in the bottom block. Such multiple block method also creates an ideal void between the blocks which termites will naturally tube over with mud tunnels in order to maintain constant moisture levels between the blocks. This void is easily inspected when removing the top block.

Similarly, an above-ground, horizontal station design may incorporate two or more blocks of food or tunneling material to provide laid side-by-side or one on top of the other such that at least one block contacts the soil. The space between the blocks as well as all exterior surfaces of each block may be easily inspected without significantly disturbing the other block.

Additionally, predrilling or preforming hole(s) into wood or foam, whether the monitors are disposed vertically or horizontally will increase the total outer surface area for termites to forage and tube over. And, when termites tunnel or tube inside the wood or foam, it is impossible to detect from a visual inspection of the exterior surfaces. The more surface area of the wood that can be exposed, therefore, the greater the number of exterior surfaces upon which termites can tube with mud tunnels for easy visual detection. Accordingly, holes preferably extending from the top to the bottom of any wood or foam material which can be tubed over are also desirable.

Slots, notches, grooves and the like may also be provided in the sides of vertical or horizontal food/tunneling materials to enhance tubing on the outside surfaces of such materials. Slots that are approximately ⅛ inch to ½ inch in width and depth, provide ideal termite tubing surfaces. Such slots are relatively easy for termites to tube up because the slot can be completely covered with less energy and mud. This accelerates the development of tubes on the outside of a surface and reduces and may eliminate the need to remove the material for inspections. Similar formations may also be included on any preformed or predrilled holes provided in the food/tunneling materials. Providing slots on the block periphery and/or on any preformed or predrilled holes may significantly increase the total surface area for tubing and inspectability.

Termites may also be "out-competed" for a particular food/shelter source by other pests such as ants and slugs. The present invention contemplates pest control equipment which avoids this situation by interfacing or incorporating above ground and/or below ground termite-specific components with general or specific insect baiting/toxicant housing components to prevent the non-termite pests from invading the termite components.

Rodent Biology Factors

Rodents such as mice, voles, rats, and moles all have behaviors that are predictable. These behavioral patterns can be exploited by incorporation of rodent-attractive features into pest control equipment design. Behaviors of mice that may be capitalized upon by use of the pest control system of the present invention include the following:

Edge-of-wall Effect: Most rodents, like many other crawling pests discussed above, like to travel close to the base of a wall or other substantially vertical surface for protection and guidance. As an additional protective measure, they especially prefer narrow passageways next to walls. Accordingly, equipment can be designed that "funnels" rodents from the edge of a wall into a rodent control station. A passageway can also be designed into rodent control equipment which creates a dark runway for rodents to traverse before entering the actual trap area.

Hole Exploration: Many types of rodents have a curious nature with respect to unexplored holes. Holes represent potential nesting areas and food. Designing equipment with the proper size opening is important as is the provision of a dark hole that creates a mysterious appeal to lure the curious rodent inside.

Acquired Avoidance Response to Glueboards: Rodents can develop learned behavior toward glueboards and other tacky surfaces which enables them to identify and avoid such materials. They can also escape from tacky surfaces if not sufficiently trapped thereon. The best circumstances under which to trap rodents with glueboards is when they are in a hurry and do not carefully investigate their surroundings prior to undertaking a certain course of action. Rodent behavioral and/or physiological factors to be considered in the design of an effective rodent glueboard monitoring/trapping station include the following:

Guard Hairs Touching Glue Surfaces: If a rodent approaches a glueboard while casually exploring an area, it will stop and investigate a glueboard surface. The rodent will reach its front foot over the glueboard. The lower guard hairs on the undersides of the rodent's foot will be pulled when they touch the glue surface. This will alert the rodent not to proceed onto the surface. If, however, a rodent can be forced to be committed to enter into an opening without the benefit of first feeling the top of the surface, trap catches on the glueboards can be increased. According to a presently preferred embodiment, therefore, the modular pest control system according to the invention, includes a "launch pad" on the outside of the entranceway of the glueboard component. The launch pad is specifically designed to be too high and too far away from the glue surface for the rodent to touch or test the glueboard surface with the guard hairs on undersides of its legs. That is, the rodent must decide to take the risk and jump down into the opening to further investigate which traps the rodent on the glueboard.

Self-Extraction from Glue Surfaces: Rodents can frequently pull themselves off of most glue surfaces, particularly when only one to three legs are trapped. Recognizing this, the present invention contemplates a rodent control device that reliably traps all four legs at once. For instance, equipment can be designed to make the surfaces around the glue surface too slick or smooth for a rodent to use for leverage for pulling itself off of the glue surface.

Response to Snap Traps: It is a common knowledge that snap traps work when rodents try to steal food from the trigger thereby setting off the dead fall arm. However, a rodent can also be trapped while trying to steal nesting materials (e.g., cotton, foam, or the like) or when they merely accidentally contact the trigger.

Rodents can escape the dead fall arm of a snap trap if the trigger is not sensitive enough or if the spring is too light and does not trap the rodent efficiently. Rodent control equipment can thus be designed to house snap traps and increase their success by building an effective trigger into humidity and attractiveness of an equipment design. Equipment designed to be placed near a water source such as a downspout is another way to make equipment more attractive since pests frequently nest under or near downspouts.

Shelter From Excess Water: Protection from excess rain, sprinklers or downspouts is critical to an ideal harborage or station design because the nest might be washed away and destroyed. Most pests seem to sense the ability of a potential harborage to keep excess water out and are attracted to those which suitably shield the pest from excess water.

Proper Void Size: Suitably sized openings, voids, or cavities in a protected area are critical to attracting certain pest species. For example, thigmotrophic pests need to feel their backs touch the interior surface of a structural void in order to find the void attractive as a harborage. Other pests prefer to excavate out a shallow amount of dirt under a flat surface to make room for a nest. Equipment can be designed to incorporate the desired void size(s) and/or configuration(s) attract one or more species of pest(s).

Termite Biology Factors

Termites have a variety of biological factors which can affect pest control equipment design. Some factors can be incorporated in order to make a station more attractive and therefore easier for termites to find. Other factors can affect, for example, how a termite monitoring material can best be inspected without disturbing the termites and having them vacate the monitoring station which might otherwise distort the monitoring process. These two categories, factors affecting the attractiveness of a termite control device, and termites' desire to remain in a control device are discussed below:

Factors Affecting the Attractiveness of a Termite Control Device

Trackways: When subterranean termite species create foraging tunnels and encounter structures which present trackways, the termite tend to follow such structures. This behavior can be exploited in the design of termite control equipment by attaching rods or similar elongate members to the side or bottom of a termite station which preferably radiate out from the station in all directions. Such structure would tend to attract termites from a distance to the station.

Water: Water or high moisture can be sensed by termites from limited distances. Incorporating water chambers or cavities into the design of a termite station can add to the station's attractiveness. Water receptacles can be made to be refilled with each service or designed to naturally trap rain and/or sprinkler water. Stations can also be designed to attract water to the general area to increase ground moisture around the trap. Designs are also contemplated to render pest control stations more readily installable near downspouts where the soil moisture is higher but which also keep excess surface water out of the stations.

Food/Tunneling Materials/Inserts: Termites are attracted to insulative and nutritive materials as habitats. As such, termites generally prefer tunneling through soft wood and other substantially rigid, yet relatively soft materials. With this in mind, termite control equipment may be designed to effectively incorporate one of both of soft woods and other such termite attractant materials. Rigid foam materials such as styrofoam and the like are attractive to termites as insulative habitats and therefore are useful as termite attractants. However, they are not actual food sources and may be used in conjunction with natural wood products to produce a composite product which is especially attractive to termites. Moisture can be used as an added attractant by allowing a wood attractant to contact the soil thereby absorbing water from the ground. Additional blocks of wood or rigid foam can also be provided and prevented from touching the soil in order to limit the overall rate and extent of wood rot and render the moistened block more attractive with greater termite activity. The moisture content of foam materials may be enhanced by including preformed holes or receptacles into the foam that can be refilled or capture ground water whereby water would function as an added attractant to the foam, particularly in dry climates.

Ground Shadows: Subterranean termites are attracted to so-called "shadows" of large surface area objects on the ground surface. Such objects (such as a large rock on the ground) can be perceived as both a natural protector from rain water and a natural humidity chamber where moderate levels of ground water may condense. This can be exploited from a pest control system equipment design perspective by making a termite monitoring/control devices that are large and flat and adopted for placement on the ground surface. Ports may also be provided inside the station that can be filled from above with water and gradually release the water into the ground below the station to draw pests to the station.

Ground Level Foraging: Some species of subterranean termites may prefer to forage close to the ground level (i.e., at the top 0–6 inches of soil). This behavior can be exploited by equipment that has access ports relatively close to the ground level but not so close to allow surface water from running into the station. Additionally, a trackway such as a long tube or rod attached to the station may be inserted down into the ground to lead the termites into the bottom of a station.

Factors Affecting Termites' Desire to Remain in a Control Device

If subterranean termites are disturbed after they enter a monitoring station, they may leave the food/tunneling source and not return thereby compromising the accuracy of the monitoring test. Many factors can deter termites from continuing to feed and tunnel in a given monitor or bait/toxicant source. Many of these factors can be lessened by proper equipment design as discussed below.

One of the primary problems that can sufficiently disturb termites to cause them to leave a monitoring site is the removal of the feeding/tunneling source for routine inspections. With this in mind, equipment can be designed that makes the feeding/tunneling source easier to inspect while minimizing disturbance of the station. According to the invention, some methods to ease inspection include the following:

Multiple Blocks of Food/Tunneling Sources: Two or more blocks of wood and/or foam can be placed inside a station. If placed vertically into the ground, the blocks are separable from one another and placed upright end-to-end. In subterranean stations, the bottom block may be allowed to project through the station and contact the soil. This increases the wood moisture of the bottom block. The increased wood moisture of the bottom block will increase the amount of termite activity therein. Therefore, the top block can be removed for closer inspection without disturbing the primary termite activity in the bottom block. Such multiple block method also creates an ideal void between the blocks which termites will naturally tube over with mud tunnels in order to maintain constant moisture levels between the blocks. This void is easily inspected when removing the top block.

Similarly, an above-ground, horizontal station design may incorporate two or more blocks of food or tunneling material to provide laid side-by-side or one on top of the other such that at least one block contacts the soil. The space between the blocks as well as all exterior surfaces of each block may be easily inspected without significantly disturbing the other block.

Additionally, predrilling or preforming hole(s) into wood or foam, whether the monitors are disposed vertically or horizontally will increase the total outer surface area for termites to forage and tube over. And, when termites tunnel or tube inside the wood or foam, it is impossible to detect from a visual inspection of the exterior surfaces. The more surface area of the wood that can be exposed, therefore, the greater the number of exterior surfaces upon which termites can tube with mud tunnels for easy visual detection. Accordingly, holes preferably extending from the top to the bottom of any wood or foam material which can be tubed over are also desirable.

Slots, notches, grooves and the like may also be provided in the sides of vertical or horizontal food/tunneling materials to enhance tubing on the outside surfaces of such materials. Slots that are approximately ⅛ inch to ½ inch in width and depth, provide ideal termite tubing surfaces. Such slots are relatively easy for termites to tube up because the slot can be completely covered with less energy and mud. This accelerates the development of tubes on the outside of a surface and reduces and may eliminate the need to remove the material for inspections. Similar formations may also be included on any preformed or predrilled holes provided in the food/tunneling materials. Providing slots on the block periphery and/or on any preformed or predrilled holes may significantly increase the total surface area for tubing and inspectability.

Termites may also be "out-competed" for a particular food/shelter source by other pests such as ants and slugs. The present invention contemplates pest control equipment which avoids this situation by interfacing or incorporating above ground and/or below ground termite-specific components with general or specific insect baiting/toxicant housing components to prevent the non-termite pests from invading the termite components.

Rodent Biology Factors

Rodents such as mice, voles, rats, and moles all have behaviors that are predictable. These behavioral patterns can be exploited by incorporation of rodent-attractive features into pest control equipment design. Behaviors of mice that may be capitalized upon by use of the pest control system of the present invention include the following:

Edge-of-Wall Effect: Most rodents, like many other crawling pests discussed above, like to travel close to the base of a wall or other substantially vertical surface for protection and guidance. As an additional protective measure, they especially prefer narrow passageways next to walls. Accordingly, equipment can be designed that "funnels" rodents from the edge of a wall into a rodent control station. A passageway can also be designed into rodent control equipment which creates a dark runway for rodents to traverse before entering the actual trap area.

Hole Exploration: Many types of rodents have a curious nature with respect to unexplored holes. Holes represent potential nesting areas and food. Designing equipment with the proper size opening is important as is the provision of a dark hole that creates a mysterious appeal to lure the curious rodent inside.

Acquired Avoidance Response to Glueboards: Rodents can develop learned behavior toward glueboards and other tacky surfaces which enables them to identify and avoid such materials. They can also escape from tacky surfaces if not sufficiently trapped thereon. The best circumstances under which to trap rodents with glueboards is when they are in a hurry and do not carefully investigate their surroundings prior to undertaking a certain course of action. Rodent behavioral and/or physiological factors to be considered in the design of an effective rodent glueboard monitoring/trapping station include the following:

Guard Hairs Touching Glue Surfaces: If a rodent approaches a glueboard while casually exploring an area, it will stop and investigate a glueboard surface. The rodent will reach its front foot over the glueboard. The lower guard hairs on the undersides of the rodent's foot will be pulled when they touch the glue surface. This will alert the rodent not to proceed onto the surface. If, however, a rodent can be forced to be committed to enter into an opening without the benefit of first feeling the top of the surface, trap catches on the glueboards can be increased. According to a presently preferred embodiment, therefore, the modular pest control system according to the invention, includes a "launch pad" on the outside of the entranceway of the glueboard component. The launch pad is specifically designed to be too high and too far away from the glue surface for the rodent to touch or test the glueboard surface with the guard hairs on undersides of its legs. That is, the rodent must decide to take the risk and jump down into the opening to further investigate which traps the rodent on the glueboard.

Self-Extraction from Glue Surfaces: Rodents can frequently pull themselves off of most glue surfaces, particularly when only one to three legs are trapped. Recognizing this, the present invention contemplates a rodent control device that reliably traps all four legs at once. For instance, equipment can be designed to make the surfaces around the glue surface too slick or smooth for a rodent to use for leverage for pulling itself off of the glue surface.

Response to Snap Traps: It is a common knowledge that snap traps work when rodents try to steal food from the trigger thereby setting off the dead fall arm. However, a rodent can also be trapped while trying to steal nesting materials (e.g., cotton, foam, or the like) or when they merely accidentally contact the trigger.

Rodents can escape the dead fall arm of a snap trap if the trigger is not sensitive enough or if the spring is too light and does not trap the rodent efficiently. Rodent control equipment can thus be designed to house snap traps and increase their success by building an effective trigger into the station design for better securing methods with the food or nesting materials.

Rodents can also be trapped in a snap trap if they are in a hurry and run into or onto a trap trigger. The present invention proposes rodent equipment designs that encourage rodents to jump through an opening and land on the trigger in a manner similar to the launch pad described above.

Hoarding Bait: Rodents are known to hoard food if they find a fresh source. This can be a problem with rodenticidal baits because the bait can be carried away by a rodent and dropped onto a surface such as a restaurant food preparation table and the like, thereby contaminating the surface. The present invention includes rodent control equipment designs that can prevent hoarding by either securing the bait inside an enclosed area or with a wire so that the rodent can only eat what is available at the station and cannot carry off larger pieces.

Flea Biology Factors

Fleas are attracted, particularly from their pupae form onward, by heat, carbon dioxide, light or any combination thereof. Equipment can therefore be designed to include any or all of these attractants for monitoring and/or low-level control of fleas. Because of their life cycle, Insect Growth Regulators or IGRs can be used to interrupt the cycle and prevent future offspring or inhibit development through one or more stages. These IGRs are volatile and can be dissipated with air flow over a compartment with a station. Adult fleas move by jumping, not crawling. Therefore, equipment designed to trap fleas that are attracted inside an enclosed space should have a large opening to allow easy access to the glue surface or bait/toxicant. If the top of the compartment with the glue needs to be covered, it can be covered partially with a tunneled lid that causes fleas to slide down the funnel and onto a tacky glue surface which may also include a bait and/or toxicant substance.

Ant Feeding Behaviors

Ants are interdependent social insects which have diverse dietary requirements. Many ant species typically require protein, sugars, other insects, plants, honeydew (from aphids) and oils on a regular yet variable basis. The foraging ants of a colony are instructed through chemical cues as to the type of food source the colony needs at any particular time. These needs may change daily, hourly or even more frequently depending on the species, time of year, availability of food sources, etc. Because of their seeming randomness, these changing dietary needs are currently impossible to predict with reliability by even the most sophisticated scientific techniques. However, to increase the likelihood of ant attraction, equipment can be designed to house as many different known ant food sources in as many physical consistencies as possible. In addition, equipment can be designed to attach to plants and trees to take advantage of the plants as additional food sources. Equipment may also be designed to attract and trap other insects and pests which can also provide an additional food source for ants in that they may feed on the dead pests.

With the foregoing considerations in mind, the reader's attention is directed to FIG. 1 which reveals a first aspect of a modular pest control system constructed in accordance with the present invention.

The modular pest control system is identified generally by reference numeral 10 and includes a first component 12, a second component 14 and resilient means 16 for releasably connecting the first and second components. In accordance with this particular embodiment, first component 12 is a pest control device and second component 14 serves as means for securing the first component to an object.

Within the context of the present invention, the "objects" to which the first component 12 may be secured may include, without limitation, interior and exterior building surfaces and materials, poles, pipes, cables, trees and other vegetation, and targeted areas of soil. As embodied in FIG. 1, first component 12 is a ground crawling pest control device. A "ground crawling pest" shall be construed to include ground crawling insects and similar creatures including, without limitation, ants, cockroaches, crickets, ground beetles, earwigs, ladybugs, fleas (although adult fleas move by jumping rather than crawling or walking), spiders, centipedes, millipedes, slugs, and flying insects which may land and crawl or walk into a ground crawling pest control device such as first component 12. A ground crawling pest within the present context, however, shall not include termites or rodents.

Furthermore, the act of "controlling" any pest referred to herein shall include any one or more of attracting, repelling, monitoring, trapping and killing of the pest. Similarly, "pest control means" or "pest control material", as used herein, may include any device or material for effectuating the desired pest control. Such means and materials may include, without limitation, snap traps for trapping and/or killing rodents, tacky-surfaced glue boards for trapping rodents or ground crawling pests, water and edible toxicants for any pest discussed herein, nutritive and/or insulative shelter material for termites, pheromones and related scent-based pest attractants, carbon dioxide for attracting termites and fleas, and light sources for attracting fleas.

Additionally, according to several additional embodiments of the present modular pest control system described hereinafter, first component 12 may comprise a pest control device capable of controlling at least one species of ground crawling pest, termite and/or rodent, and second component 14 may be another pest control device, e.g., a subterranean termite tube.

As embodied in FIG. 1, second component 14 is a soil anchor 18 for securing the first component 12 to the earth and resilient means 16 comprises at least one or, more preferably, two or more spring clips 20. Each spring clip comprises a flexible member terminating in a lip 22 which is configured to engage with cooperating structure to releasably connect the first and second components 12, 14. The spring clips 20 may be separate from the first and/or second components 12, 14 but are preferably carried thereby so as to prevent misplacement of the clips. More preferably, the spring clips are formed integrally with the first or second components 12, 14, which components are preferably fabricated from high-impact, UV-inhibited polypropylene or similar high strength moldable plastic material. As illustrated, spring clips 20 are preferably upwardly directed resilient members which are carried by the second component 14 and whose lips 22 releasably engage with cooperating structure in the form of mating recesses 24 carried by the first component 12 which are adapted for receiving the lips 22. It will be understood, however, that the relative positions of one or more of the spring clip(s) 20 and recess(es) 24 may be reversed, i.e., at least one spring clip 20 may be carried by the first component 12 and at least one corresponding recess 24 may be carried by the second component 14.

Soil anchor 18 comprises a spike member 26 having a longitudinal axis "A", a first end 28 which functions as a soil penetration tip and a second end 30 which functions as a support for an undersurface for the first component 12. Soil anchor 18 further comprises one or more means for enhancing retention of the spike member 26 in soil. Preferably, the soil retention enhancing means may comprise at least one or, more desirably, a plurality of radial vanes 32 extending between the first and second ends 28, 30. Although not necessary, it is preferred that the vane(s) 32 taper from the second end 30 to first end 28 of spike member 26. The soil retention enhancing means further preferably comprise at least one barb 34 provided along the outer edge of at least one of the radial vanes 32. Additionally, at least one of the barbs 34 further preferably includes a projection 36 extending generally coincident with the barb and protruding laterally with respect to its associated vane 32 to further enhance retention of the spike member 26 in soil. Other optional and preferable soil retention means may include at least one aperture 38 provided in one or more of the vanes 32.

Referring to FIG. 2, wherein like or similar reference numerals designate like or similar elements, as is true throughout the remaining views, there is shown another soil anchor 18a which is suitable for use as a second component for securing a first component such as the pest control device 12, or other pest control devices described hereinafter, to soil. Soil anchor 18a is preferably fabricated from the same or similar materials as soil anchor 18 of FIG. 1. Likewise, soil anchor 18a preferably includes spring clips 20 and some or, more preferably, all of the soil retention enhancement means described above in respect to FIG. 1. For brevity of description and clarity of illustration, therefore, only those elements of soil anchor 18a which are not present in soil anchor 18, which are not readily visible in FIG. 1 or which are otherwise necessary for a proper understanding of the present invention, will be described in detail and identified by reference numerals in FIG. 2. A similar approach will also be taken in the description and illustration of other drawing figures herein which contain common and at least once disclosed subject matter.

The second or upper end of soil anchor 18a (and soil anchor 18) preferably includes a support plate 40 disposed in a plane extending substantially perpendicular to the longitudinal axis A (FIG. 1) and adapted for contacting the undersurface of a pest control device such as first component 12 of FIG. 1. Support plate 40 may assume any curvilinear and/or rectilinear shape, e.g., circular as shown in FIG. 2, that is suitable for providing stable support of the first pest control device component of the modular pest control system of the present invention.

According to presently preferred embodiments of the modular pest control system according to the invention, means are provided for establishing a gap between the undersurface of a first pest control device component and a second component such as soil anchors 18 or 18a to permit water drainage therebetween and, possibly, provide a harborage for pests. Although the gap establishing means may be provided on the undersurface of the first component, presently preferred designs contemplate provision of such means atop the second or upper end of the soil anchors 18 or 18a. More particularly, suitable gap establishing means comprise at least one raised formation 42 provided on the upper surface of support plate 40. To provide effective water drainage and maintain a low profile of first component 12, the raised formation(s) 42 should be less than about 1/10 inch and preferably less than about 1/20 inch in height.

Soil anchor 18a is designed for anchorage in somewhat softer soils than soil anchor 18. As such, it should be more elongated for deeper penetration into the soil and desirably includes, adjacent its lower or penetration end, a pair of laterally projecting pivot pins 44 (only one of which is shown in FIG. 2) for pivotally supporting an optional, generally duck bill shaped toggle member 46 shown in FIGS. 3 through 6.

Although not always necessary, there may be times when the soil is so loose that toggle member 46 is useful for proper anchorage of the first component. Toggle member 46 is preferably semiconic including an arcuate wall 48 bounded by a pair of wings 50 which include openings 52 for receiving pivot pins 44 of soil anchor 18a in the manner illustrated in FIG. 6. Toggle member 46 may be fabricated from any suitable substantially rigid metallic or plastic material.

To install a modular pest control system according to the present invention in soil, therefore, a user selects an appropriate first pest control device component 12 and second soil anchor component 18 or 18a. If toggle member 46 is also necessary, it must be first attached to the pivot pins 44 of soil anchor 18a. Then the user may connect the first and second components 12, 14 by overcoming the spring force of resilient means 16 until the lips 22 of the spring clips 20 snap into engagement with recesses 24. The first and second components may then be manually pressed or gently pounded as a unit into the soil until the second end of the spike member is substantially flush with the ground surface (or, if present, the undersurface or the support plate 40 is in substantial contact with the ground surface). Alternatively, the appropriate soil anchor 18 or 18a may be inserted into the soil to the desired depth and the first pest control component may be attached thereto in the manner described above. Thereafter, the system may remain effectively embedded in the soil throughout the intended service life of the pest control device.

Figure 7:
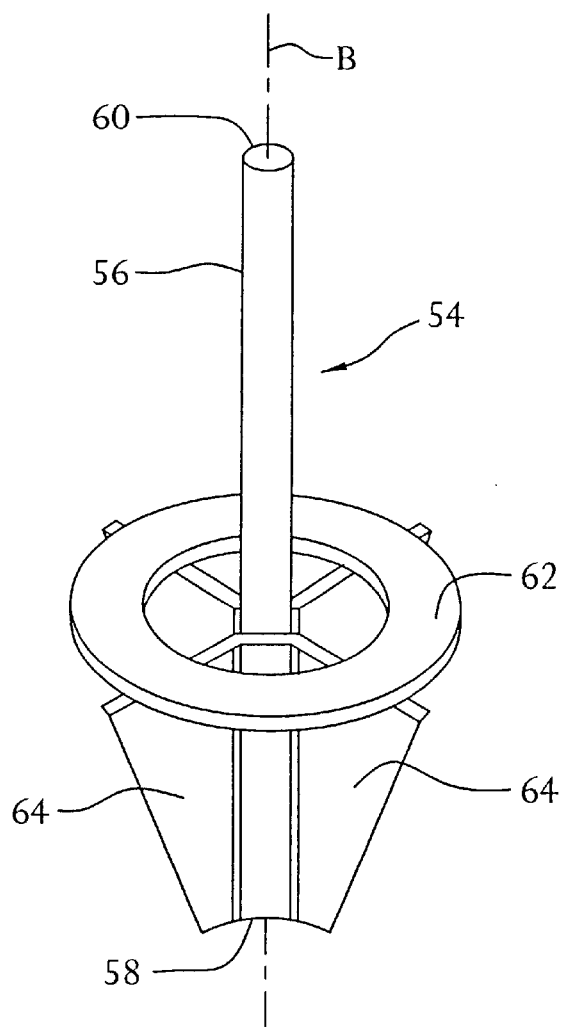
FIG. 7 is a perspective view of a punch tool for piercing hard soil in preparation for insertion into the soil of a soil anchor component of the modular pest control system according to the present invention.

In the event the modular pest control system according to the invention is to be anchored in especially hard soil, a punch tool 54 constructed substantially as illustrated in FIG. 7 may be used to initially pierce the soil to facilitate subsequent insertion of a vaned soil anchor such as anchor 18. Punch tool 54 is preferably formed substantially entirely of a hard and rugged plastic or metal material. For greatest penetrability results and service life punch tool is desirably formed from steel. The punch tool includes an elongate bar 56 having a longitudinal axis "B" and first and second ends 58 and 60, respectively. First end 58 functions as a soil penetration tip and second end 60 functions as a striking surface for an unillustrated striking tool such as a hammer or the like which is used to drive the punch tool 54 into the hard soil.

The punch tool 54 also preferably includes means 62 for limiting penetration of the tool into soil. Suitable means 62 may include a plate extending substantially perpendicular to bar 56. Alternatively, means 62 may, as illustrated, assume the form of an annular ring affixed to the upper end(s) of one or more vanes 64. Vanes 64 are preferably substantially parallel to longitudinal axis B of bar 56 and project radially therefrom adjacent first end 58. The vanes 64 should correspond in number, angular disposition and general configuration to the vanes, e.g., vanes 32, provided on the vaned soil anchor such as anchor 18. Following pounding of the punch tool into the soil and removal therefrom, the selected soil anchor may be inserted by pressing or light tapping of the anchor into the hole left by the punch tool.

FIG. 8 is a side elevation view of a gap or void 66 which commonly forms when soil 68 dries, contracts and separates from the foundation of a building 70. It may oftentimes be necessary to place a modular pest control system according to the invention closely adjacent the building 70 under such dry soil conditions. Consequently, the present invention contemplates a soil anchor shown in FIGS. 9 and 10 which is particularly suited for such purposes.

As seen in those figures, the soil anchor, identified by reference numeral 18b, includes a spike number 26 including resilient means 16 at the second or upper end thereof adapted for releasable connection to an unillustrated first pest control device component. The spike member 26 includes a plurality, preferably three, barbed vanes 32 desirably incorporating at least some of the additional soil retention enhancement means discussed above as well as a support plate 40 including drainage gap establishment means 42.

As is most clearly shown in FIG. 10, the spike member 26 is not centered under the overlying support plate 40 and has no rearwardly projecting vane. Hence, the soil anchor 18b may be inserted into the gap 66 such that the rear face of the spike member 26 essentially abuts the face of the building 70. This enables firm anchorage of the modular pest control system in the soil gap 66 while keeping the unillustrated first pest control component closer to the building, which enables effective exploitation of the "edge-of-wall" effect discussed hereinabove.

FIGS. 11 and 12 reveal another presently preferred embodiment of a second component 14 suitable for securing the first component 12 of the modular pest control system 10 of the present invention to an object. According to this embodiment, the object may include, without limitation, any substantially vertical interior or exterior building surface or material, pole, tree trunk or other large and sturdy vegetation. Accordingly, second component 14 is desirably formed as a rigid, angled metal plastic bracket 72 including a first component support plate 40 integrally connected to a mounting plate 74. Support plate 40 preferably includes resilient means 16 and drainage gap expansion means 42 for the reasons discussed herein above. Mounting plate 74 preferably includes a plurality of through-bores 76, slots 78 or other similar openings to permit passage therethrough of suitable unillustrated fasteners such as screws, nails or the like for securing the bracket 72 to an object. The rear face of the mounting plate may also be fitted with double-sided pressure adhesive tape or even suction cups (not shown) to enable ready mounting of the bracket to especially smooth walls or panes of glass. Mounting of the bracket 72 on trees and similar vegetation is often advantageous in that may place the first pest control component close to flowers, fruits or other vegetable matter that may be highly attractive to certain species of pests.

FIGS. 13 through 16 reveal a presently preferred construction of a base portion or simply, "base" 80 of a ground crawling pest control device suitable for use as the first component 12 of the modular pest control system 10 of FIG. 1 or other embodiments of such system described hereinafter.

Base 80 preferably includes the aforementioned recesses 24 (FIGS. 13, 14 and 15) for matingly receiving the lips 22 of resilient spring clips 20 (FIG. 1). In addition, as perhaps best appreciated by reference to FIG. 21, base 80 is preferably releasably connectable to a cover portion or, simply, "cover" 82 of the ground crawling pest device through resilient means 84. Resilient means 84, similar to resilient means 16 described above, may include one or more spring clips 86 which are preferably fixedly attached to one or both of the base 80 and cover 82 and which termination in lips 88 which are adapted to engage with corresponding recess(es) 90 provided one or both of the base 80 and cover 82.

According to a presently preferred construction, resilient clip means 84 comprises two or more upwardly directed resilient spring clip members 86 which are carried by base 80 (FIGS. 13, 14, 16 and 21) whose lips 88 releasably engage with mating recesses 90 carried by the cover 82 (FIGS. 17, 18, 20 and 21).

As discussed hereinabove, ants have variable dietary needs which may change daily, hourly or even more frequently depending, without limitation, on the species, time of year, availability of food sources, and the like. In addition to or perhaps concomitant with their nutritional needs, ants have also shown tendencies for consumption of foods of various physical consistencies ranging from solid or granular to semisolid to viscous liquids or syrups. This phenomenon may also be a characteristic of other species of ground crawling pests. Recognizing this, the base 80 preferably incorporates at least two or more areas of distinct constructions particularly adapted for accommodating different pest control materials (typically toxic baits) of differing physical consistencies.

Figure 13:
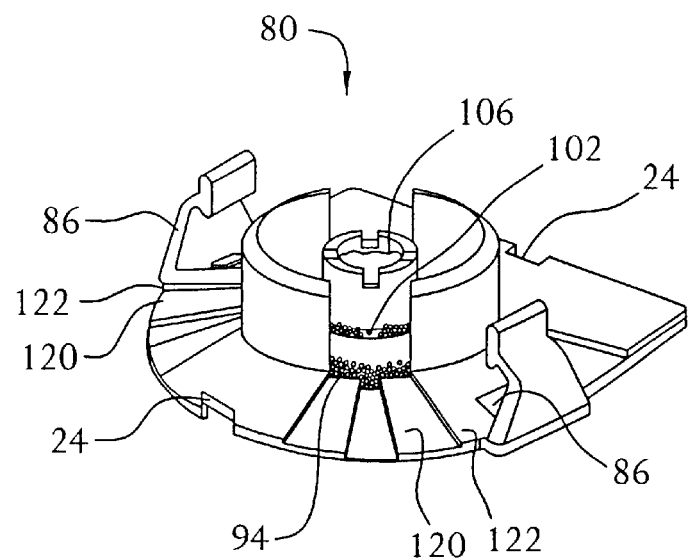
FIG. 13 is a perspective view of a base portion of a first embodiment of a pest control device according to the present invention.
Figure 14:
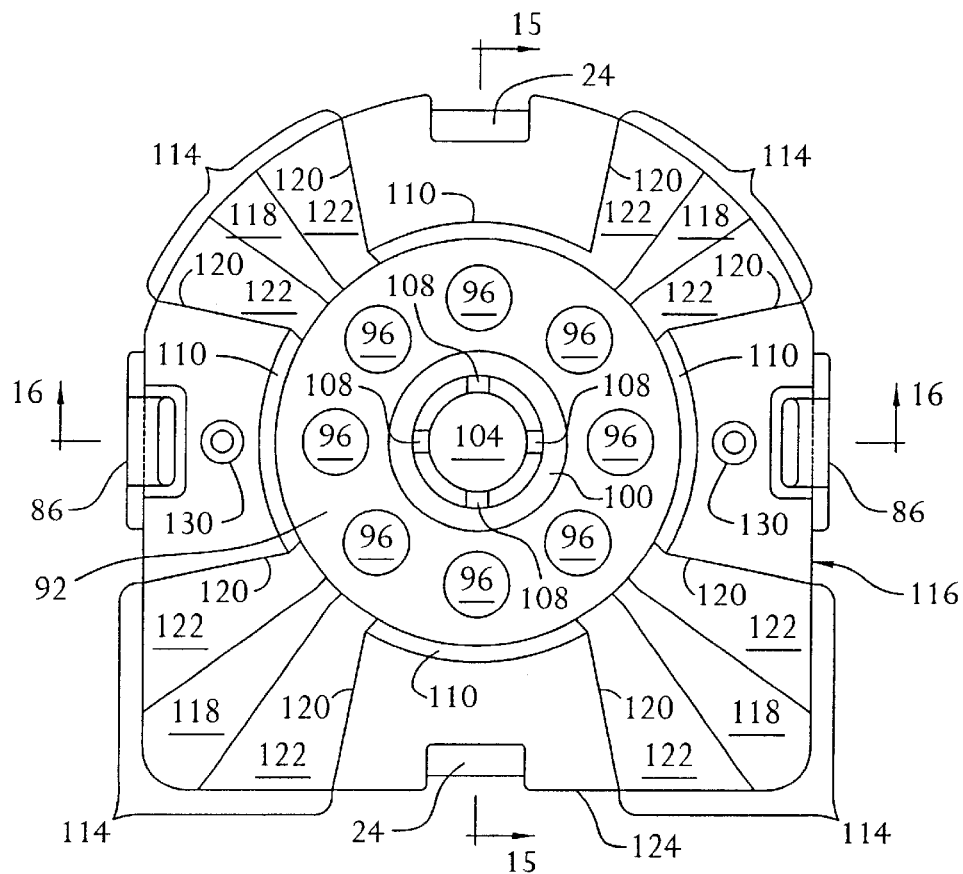
FIG. 14 is a top plan view of the pest control device base portion of FIG. 13.
Figure 15:
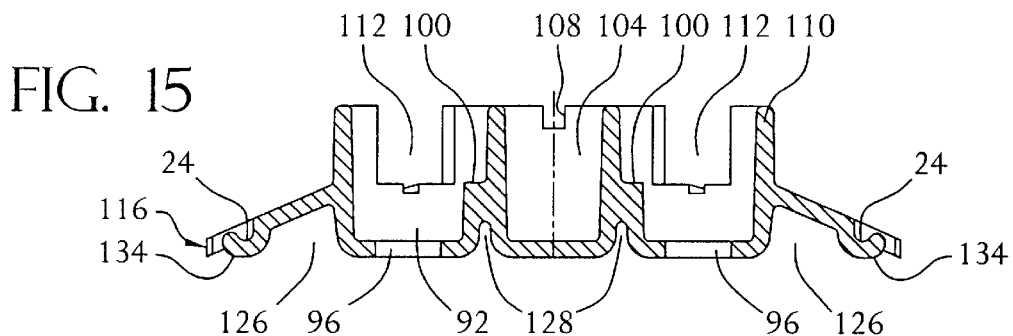
FIG. 15 is an elevational cross-section view taken along line 15—15 of FIG. 14.
Figure 16:
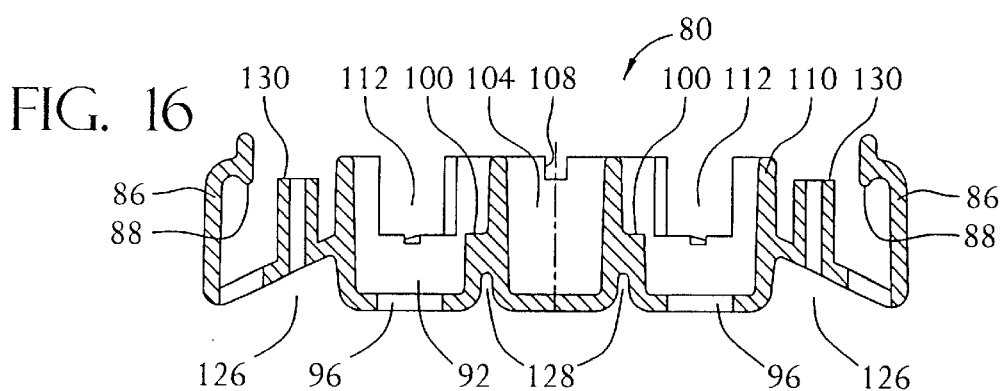
FIG. 16 is an elevational cross-section view taken along line 16—16 of FIG. 14.

More specifically, base 80 preferably comprises at least a first area 92, typically the area of greatest volume, defining a first construction for receiving a quantity of solid or granular material 94 (FIG. 13). As shown in FIGS. 14, 15 and 16, first area 92 is preferably formed as an annular chamber having a porous floor. The porous floor may be created by a plurality of holes 96 disposed about the floor of the area or chamber 92. A porous floor is essential for storing granular bait materials because standing water in chamber 92 would quickly result in waterlogging and decay of the material.

Existing molding techniques, however, do not consistently and reliably produce openings of a small enough size to retain granular material within the chamber 92 yet permit proper water drainage therethrough. Consequently, openings 96 should have individual and collective areas sufficient to permit unrestricted passage of water. However, when made of this size, which is readily obtainable by conventional molding processes, holes 96 are usually larger than the grains of bait material to be retained in chamber 92. To prevent loss of granular bait material, therefore, the ground crawling first pest control component according to the present invention further preferably includes a removable annular screen 98 (FIGS. 1 and 21) made of metal or plastic and adapted to lie on the floor of the chamber 92 beneath granular bait material. The screen 98 should have openings sufficient to permit passage of water and resist passage of the granular pest control material 94. Alternatively, the granular pest control material 94 may also be prepackaged in a screened bag or similar container which can be placed in chamber 92.

Base 90 is further preferably provided with at least one additional area having at least one additional construction substantially different from the porous-floored first construction of chamber 92. The at least one additional area is adapted for receiving a quantity of at least one additional pest control material having at least one physical consistency substantially different from the granular material 94 which is adapted for storage within chamber 92. Hence, because both semisolid and liquid materials have been observed to function well at certain times as ant attractants (and one or the other may also serve as attractants for other ground crawling pests), base 90 also preferably comprises designated areas structurally adapted for receiving semisolid and liquid, typically viscous liquid, pest control materials.

The first of these additional areas has a construction adapted to receive semisolid pest control materials including, but not limited to, tacky pastes, gels, caulks and other materials that generally have a high water content but retain their shape and resist running, even if applied on vertical surfaces or on the undersides of any "ceiling surfaces" of a pest control device. This first additional area may be a continuous or discontinuous annular support surface or ledge 100 preferably formed at least one or both of the inner and outer redial peripheries of first chamber 92 at a predetermined height from the floor of the first chamber. Support surface 100 is adapted to receive a quantity of at least one semisolid bait, identified by reference numeral 102 in FIG. 13, which is physically separate from the first chamber 92 yet still accessible to most ground crawling pests including ants.

The second additional area, reference numeral 104 has an additional construction different from both the first, open-bottom chamber 92 and support surface 100. The second additional area 104 is preferably formed as a closed-bottom chamber adapted for receiving a quantity of liquid pest control material 106 (FIG. 13). Such materials may include thin liquid materials such as baited or unbaited water to comparatively viscous water-, syrup- or jelly-based liquid baits. If desired, the upper edge of chamber 104 may be provided with one or more small notches or similar openings 108 of a size sufficient to permit ingress into the chamber 104 by ants to the substantial exclusion of other ground crawling pests. For compactness, the first area 92, the first additional area 100 and the second additional area 104 are preferably concentrically disposed with respect to one another.

Additionally, although not illustrated, at least one of the first area 92, the first additional area 100 and the second additional area 104 may comprise a plurality of discrete zones. For example, screen 98 may have two or more upstanding dividers which separate chamber 92 into at least two zones. In this way, any of the first area 92 and the first and second additional areas 100, 104 may receive a plurality of granular, semisolid and liquid pest control materials, respectively. Among the advantages provided thereby include the ability to separate baits of similar physical consistency which may be incompatible with one another or are tailored for different species of ground crawling pest, and the ability to perform product evaluation. For instance, granular ant baits may be contaminated by slug baits and can be isolated therefrom by suitable dividers provided in the first chamber. And, several different competitive brands of granular, semisolid and/or liquid baits may be placed in the same pest control device to determine which brands are subject to the greatest consumption and, therefore, most favored by the targeted species of ground crawling pest.

The outer circumferential wall 110 of first chamber 92 is discontinuous to define at least one pest access opening 112. The pest access opening(s) 112 are elevated with respect to the floor of the first chamber a distance sufficient to enable an ample volume of granular material to be placed in the chamber. Base 80 further preferably comprises at least one entrance ramp 114 (FIG. 14) provided on the upper surface of the base which begins at the outer peripheral edge 116 of the base and terminates at least one pest access opening 112. The entrance ramps 114 are preferably upwardly inclined from the outer peripheral edge 116 of base 80 to pest access openings 112 at an angle of between about 5° to about 30° from horizontal.

Although ramps 114 may have generally nondescript travel surfaces, it is desirable that the ramps include means for attracting at least one species of ground crawling pest. Such pest attracting means may include means for attracting ants and other pests. For example the ramps 114 may comprise at least one grove 118 of a size and shape, including suitable width and height, to attract and accommodate ants to the substantial exclusion of other ground crawling pests. At the mouth of each groove 118, the height of the outer peripheral edge 116 of base 80 is preferably less than about 1/16 inch. Since a vertical surface greater than about 1/16 inch in height appears as a wall to ants, by making the mouth of the grooves 118 less than about 1/16 inch high, ants will be encouraged to enter the grooves rather than foraging around the base 80 and avoiding entry into the pest control device.

As depicted in FIGS. 13 and 14, the pest attracting means of ramps 114 further preferably comprise at least one juncture including a substantially vertical wall surface 120 contiguous with a floor surface 122 extending substantially laterally with respect to the wall surface 112. Such junctures enable ground crawling pests to contact the surfaces 120 and 122 as they traverse a ramp 114 to effectively exploit the edge-of-wall effect discussed hereinabove. To encourage entry of ground crawling pests other than ants onto the ramps 114, the outer peripheral edge 116 at the juncture of surfaces 120 and 122 preferably has a height of greater than about 1/16 inch. Indeed, other than at the mouths of grooves 118, the outer peripheral edge 116 of base 80 is preferably greater than about 1/16 inch in height to encourage all species of ground crawling pests to follow the outer peripheral edge and thereby encounter and enter at least one entrance ramp 114.

Furthermore, as most clearly depicted in FIG. 14, the outer peripheral edge preferably has a least one straight portion 124 to promote substantial abutting contact of the pest control device, including base 80, with a substantially linear wall at a structure in need of insect control, e.g., building 70 of FIGS. 8 and 10. This feature exploits the edge-of-wall effect in that a ground crawling pest traveling along the base of a wall with which the straight portion 124 of base 80 is in abutting contact will encounter the base and likely enter, or at least investigate, the pest control device.

An additional advantage arising from the provision of upwardly sloping ramps 114 and other raised floor surfaces of base 80 is that harborages may be created which may be attractive to certain species of ground crawling pests. For example, these harborages may include first void spaces 126 (FIGS. 15 and 16) formed beneath the ramps 114 and other outer regions of the base 80 contiguous with the ramps. The first void spaces 126 may range from about 1/32" to about 3/4" in depth and are useful in attracting a variety of ground crawling pests including large pests such as slugs, crickets and the like to smaller thigmotrophic pests such as some ants, earwigs, cockroaches and the like.

An additional preformed harborage is a substantially vertical and annular second void space 128 that may be provided between the adjacent inner and outer walls of the first area 92 and the second additional area 104, respectively, and underlying the first additional area 100. Second void space 128 creates a void for ants and other pests which serves as protection from excess surface water but which provides a humid environment conducive to egg and larval development.

Figure 19:
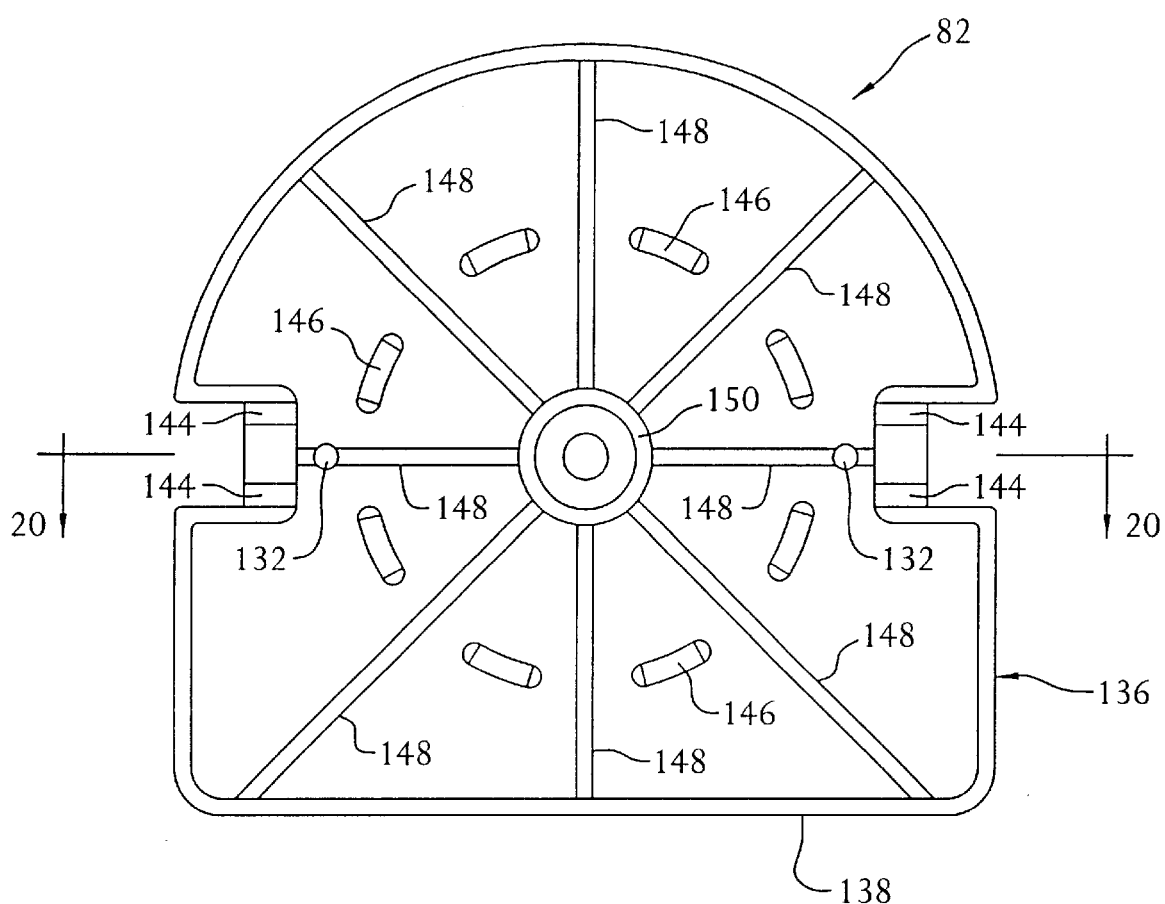
FIG. 19 is a bottom plan view of the cover portion of FIG. 17.

As seen in FIGS. 14, 15, 16 and 21 base 80 may also include socket means 130 for matingly receiving pins or similar projections 132 (see also FIGS. 19 and 20) provided on the undersurface of cover 92 to facilitate alignment and connection of base 80 and cover 82. Additionally, FIGS. 1 and 15 reveal that base 80 further preferably includes cam means 134 or similar inclined surfaces for urging flexure of the at least one spring clip 20 of resilient means 16 to facilitate connecting of the first and second components 12, 14.

FIGS. 17 through 21 represent a presently preferred construction of a cover 82 suitable for use in a ground crawling pest control device according to the instant invention. Similar to base 80, the outer peripheral edge of cover 82 is preferably constructed with a straight portion 138. Straight portion 138 is adapted to vertically align with and not overhang the straight portion 124 of base 80 such that the assembled base and cover may be brought into substantial abutting contact with the structure in need of crawling insect protection.

The upper surface of cover 82 may include one or more areas 140 adapted for receiving indicia-bearing stickers or the like. Alternatively, areas 140 can be molded, stamped or otherwise formed to display desired indicia such as advertisements, product information, and the like. Cover 82 may also include a preformed socket 142 for receiving the lower end of a flag, standard or the like for preventing loss of the pest control device when buried in mulch, wood chips, stones or other landscaping materials. FIGS. 18 through 21 show that cover 82 further preferably includes cam means 144 or similar inclined surfaces for urging flexure of the at least one spring clip 86 carried by base 80.

The undersurface of cover 82 is preferably provided with one or more downwardly projecting alignment means 146 which preferably closely interengage with either the inner or, as illustrated, the outer circumferential surface of the outer peripheral wall of the first area 92 of base 80 to further promote precise alignment during connection of the cover 82 with base 80. Further, to exploit the ridge effect discussed hereinabove, the undersurface of cover 82 is preferably provided with one or more ridge means 148 for directing ants and certain other ground crawling pests from the outer peripheral edge 136 of the cover to a location overlying at least one predetermined area of base 80 containing a desired pest control material. For example, ridge means may be useful in directing ants or other small ground crawling pests from the outer peripheral edge 136 to a region overlying the second additional area 104 of base 80. For best results, ridge means 148 is preferably less than about 1/16 inch or, more preferably, less than about 1/32 inch in height. To ensure that only pests of a predetermined size may enter the second additional area 104, the undersurface of cover 82 maybe provided with a downwardly depending ring or similar structure 150 which can be selected to protrude a predetermined distance from the bottom of the cover 82.

To reduce ingress of excess rain, sprinkler, downspout or other surface water, the cover 82, except in the region of the vertically coaligned straight portions 124, 138 of the base 80 and cover 82, is preferably dimensioned to overhang the base 80 in the manner shown in FIG. 1.

Figure 17:
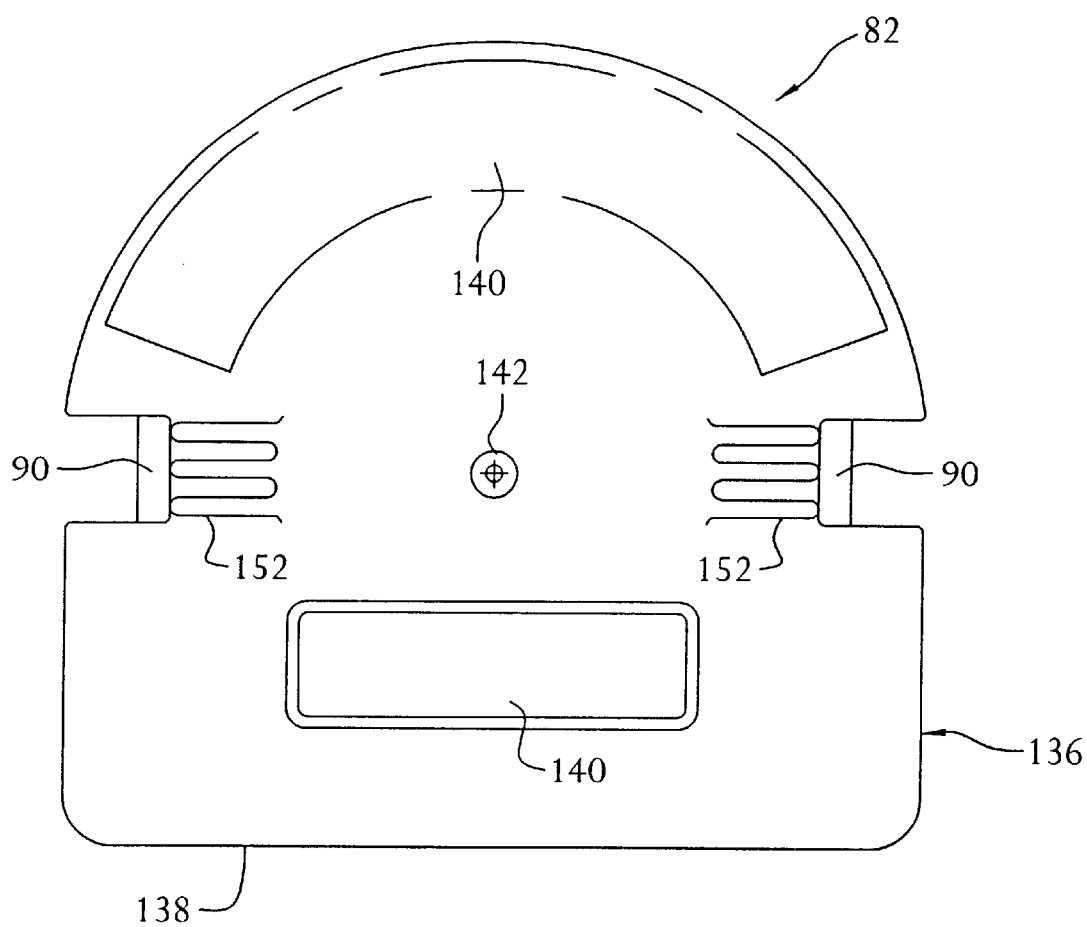
FIG. 17 is a top plan view of a cover portion of a first embodiment of a pest control device according to the present invention.
Figure 18:
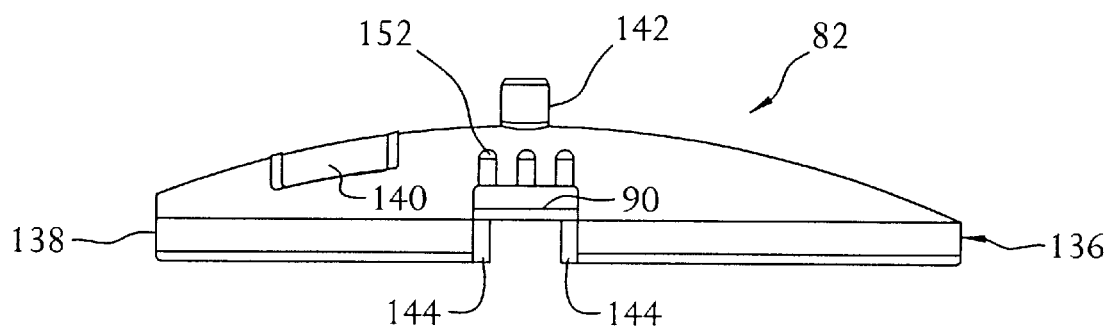
FIG. 18 is a side elevation view of the cover portion of FIG. 17.
Figure 20:
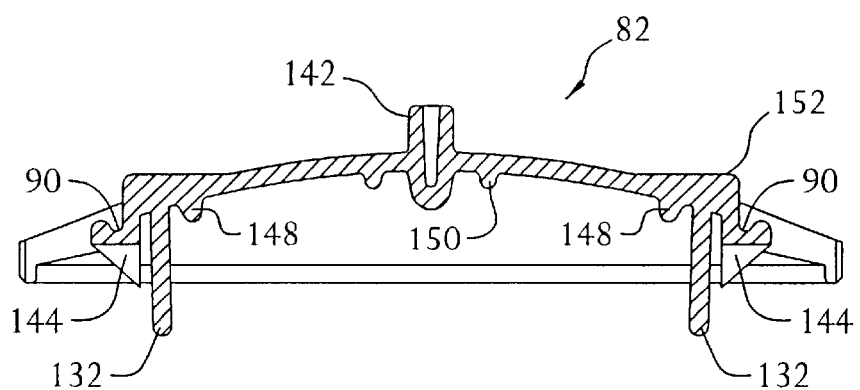
FIG. 20 is an elevational cross-section view taken along line 20—20 of FIG. 19.

Referring to FIGS. 17, 18, and 20, the upper surface of the cover 82 is desirably provided with means 152 for resisting tampering with the at least one resilient member or spring clip 86 of base 80 when the spring clip(s) 86 are engaged with the recess(es) 90 of cover 82. According to a presently preferred embodiment, the tamper resistant means preferably comprise least one raised formation means for inhibiting access to the lip(s) 88 of spring clip(s) 86 by human fingers.

It is preferable that, when the base 80 and cover 82 are connected to one another, the lips 88 of spring clips 86 are matingly and relatively tightly received in recesses 90. To facilitate detachment of the cover 82 from the base 80, therefore, the present invention further preferably comprises a release tool 154 (FIG. 21) having inclined surfaces 156 for urging simultaneous disengagement of the lips 88 of spring clips 86 from the recesses 90 of cover 82. In using the release tool 154, the user aligns the tool with the spring clips 86, presses down on the tool and lifts the cover 82. In so doing, the upper ends of the spring clips 86 are urged outwardly along inclined surfaces 156 of tool 154 to disengage the lips of 88 from recesses 90. Additionally, depending on the spacing and orientation of the spring clips 20 carried by any of the second components 14 of the modular pest control system of the present invention, the same or similar release tool may also to be used to separate the first component 12 from the second component 14.

FIGS. 22 through 24 collectively depict an exemplary, although not limitative, embodiment of a removable closed-bottom receptacle means 158 for receiving a quantity of a pest control material and configured for substantially mating placement within the first area 92 of base 80. Receptacle means 158 preferably comprises an annular cup or pan type member 160 having an annular bottom of floor 162 bounded by inner and outer side walls 164, 166. The annular cup may be open at its top as illustrated and used by itself to hold any desired volume of granular, semisolid or liquid pest control material. However, to minimize the potential for spillage of the pest control materials contained therein, the open top of cup 160 is preferably enclosed by a disk 170 which may have one or more openings 168 of predetermined size to permit ingress of ground crawling pests of certain sizes into the cup while limiting evaporation of the pest control material and increasing child resistance. Alternatively, the inner and/or outer side walls 164, 166 of cup 160 may have openings of predetermined size in lieu of or in addition to any holes that may be provided in the disk 170. The top of the disk 170 and the bottom of the cup 160 may be provided with indicia bearing labels 172 such that the receptacle means may assume the commercial form shown in FIG. 23. If the disk 170 is provided with openings 168, the upper label 172 should be removed to expose the openings 168 as shown in FIG. 24 prior to placement of the receptacle means 158 in the first area or chamber 92 of the base 80. To create additional harborage void spaces, either or both of the inner and outer side walls 164, 166 and even the underside of the floor 162 of the cup 160 may be provided with protrusion means 174 for maintaining the cup in stable yet spaced relation from the interior surfaces of the first chamber 92.

A plurality of receptacle means 158 may be stacked upon one another within the first chamber and may contain similar or dissimilar past control materials. A single receptacle means 158 or a plurality of stacked receptacle means may be selected to be of sufficient outside wall height such that, when placed in the first area 92, the size of the at least one pest access opening 112 may be reduced from its predetermined unrestricted size to less than the predetermined size to restrict access to the pest control device to one or more selected species of ground crawling pests.

Figure 25:
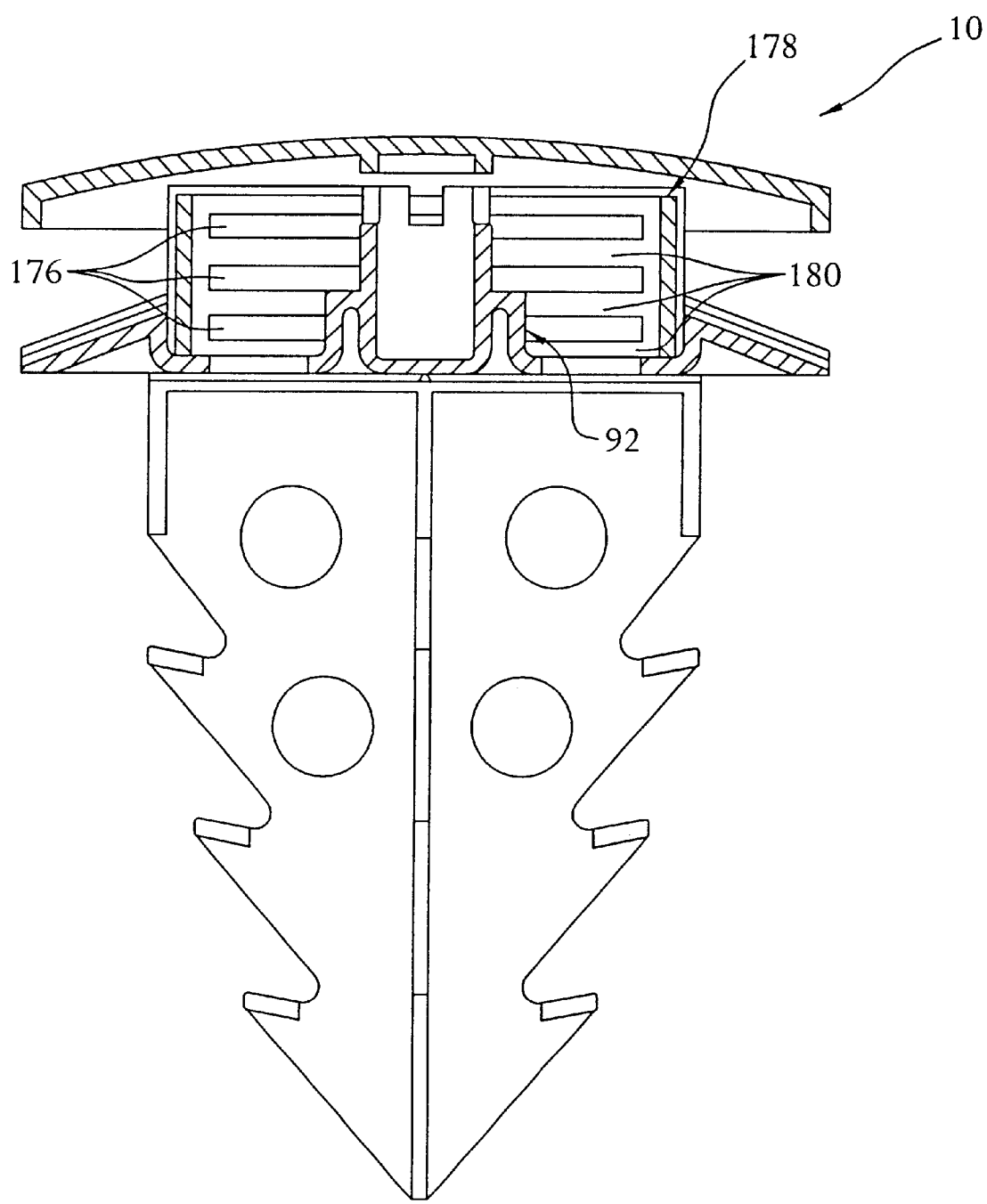
FIG. 25 is a view similar to FIG. 1 wherein the pest control device includes at least one internally disposed tacky-surfaced glueboard.

FIG. 25 represents a further use of the modular pest control system 10 of the present invention. According to this embodiment, the first area 92 is fitted with a plurality of generally annular, disk-shaped, tacky-surfaced glueboards 176 which may be supported in vertical spaced relation by a rack 178 having radial support spokes 180. It will be understood that the first area 92 may receive a single glueboard and any other pest control material receiving areas of the base 80 may also be fitted with one or more glueboards of appropriate dimensions.

Figure 26:
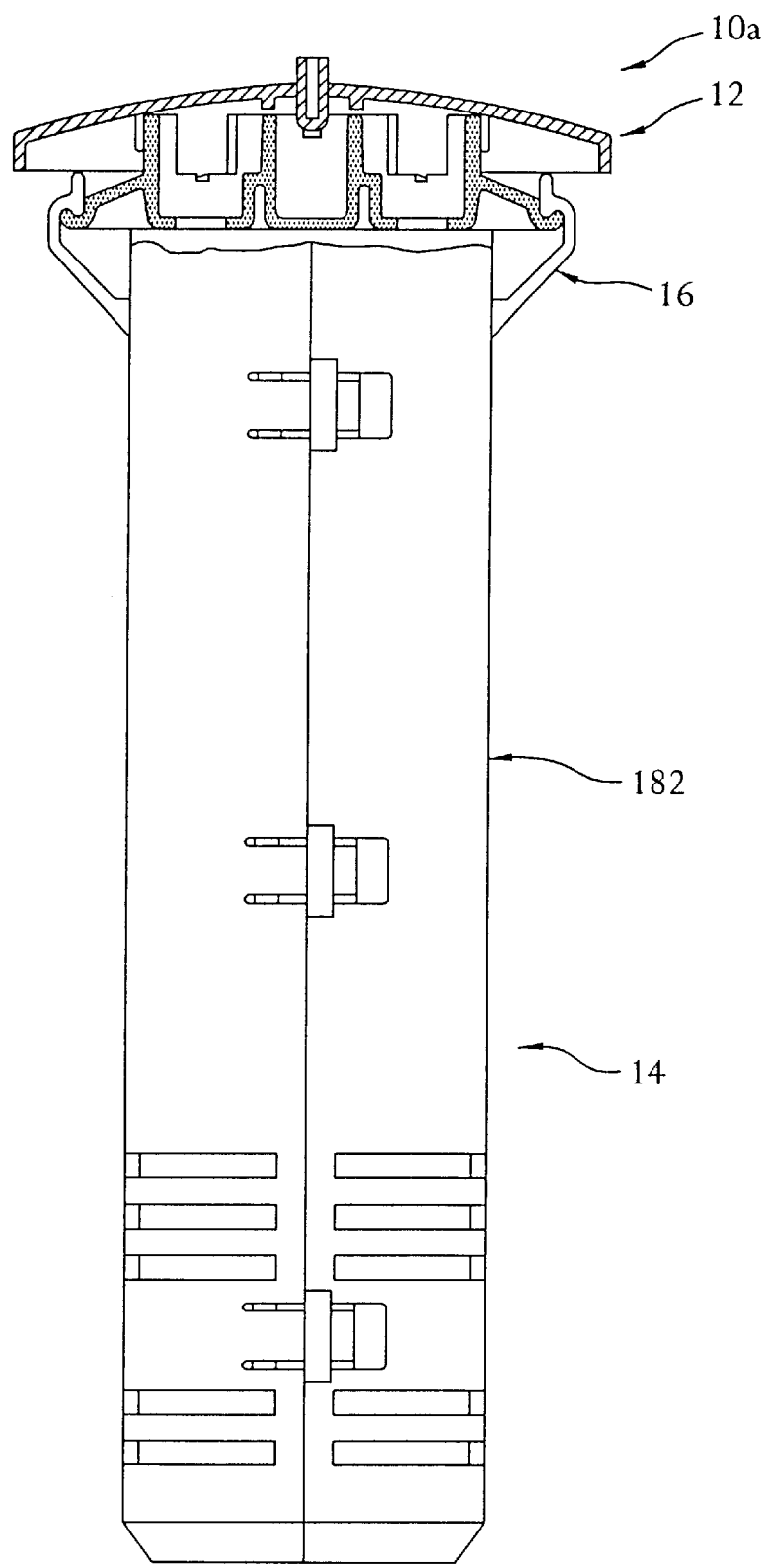
FIG. 26 is a partially cut, partial cross-section view of a further embodiment of a modular pest control system according to the present invention.

FIG. 26 illustrates a further modular pest control system according to the present invention. The system, identified generally by reference numeral 10a, comprises a first component 12 in the form of a ground crawling pest control device as discussed above. The second component 14 according to this design is a subterranean termite tube 182, the structural details of which will be described in greater detail in connection with FIGS. 43 and 44. And, the first and second components 12, 14 may be releasably connectable to one another by the aforesaid resilient means 16.

System 10a enables simultaneous surface control of ground crawling pests coupled with subterranean control of termites. Termites can be "out-competed" for pest control materials by certain ground crawling pests. An advantage to system 10a, therefore, is that it can reduce or even prevent out-competing of termites by ants, slugs and other such pests.

Figure 27:
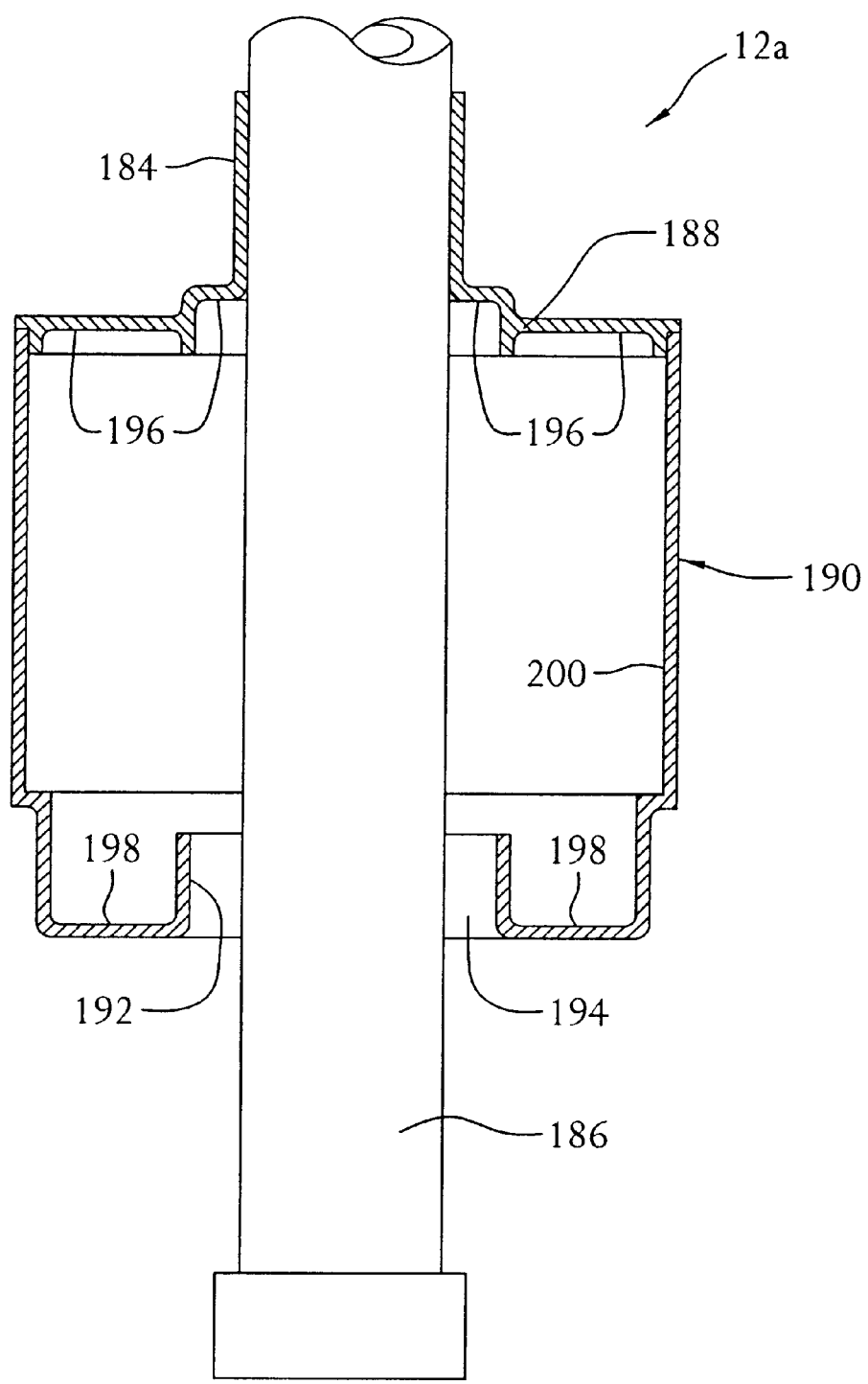
FIG. 27 is an elevational cross-section view of a further embodiment of a pest control device according to the present invention disposed about a leg of a legged structure.

FIG. 27 represents a further embodiment of a ground crawling pest control device, identified generally by reference numeral 12a, according to the present invention. Similar to pest control device 12, device 12a includes at least two areas of structurally and functionally distinct construction for receiving at least two pest control materials of substantially different physical consistency.

Pests moving up or down the legs of hospital beds, kitchen equipment, sinks, food preparation tables, storage shelving and related structures may be controlled using device 12a. The device preferably includes an expandable and contractable boot or sleeve 184 that may be formed from natural or artificial rubber, rubber-like compounds or other suitable elastomeric materials. The sleeve should be able to accommodate legs of legged structures which typically range from about 1/2" to about 1¾" in diameter or similar cross-sectional dimension. As illustrated, boot 184 is secured to a leg 186 of a legged structure. If desired or necessary, a clamp or adhesive tape may be used to supplement the gripping engagement of the boot 184 to leg 186. The lower end of the boot is preferably attached to cover 188 which, in turn, is preferably releasably securable to a generally cylindrical body 190 the lower end of which terminates in an upwardly turned lip 192 defining annular opening 194 having a diameter sufficient to accommodate leg 186 and any species of ground crawling pest likely to be found in the target environment.

The undersurface of cover 188 preferably is provided with one or more support surfaces 196 suitable for receiving desired quantities of semisolid, tacky bait materials which can be suspended upside down. Lip 192 and the adjacent bottom structure of body 190 define an annular cup 198 suitable for receiving granular or liquid baits or a suitably configured glueboard. The inner wall 200 of body 190 is preferably roughened to enhance retention of residual pesticides that may be sprayed, brushed or otherwise applied thereto.

A ground crawling pest which finds leg 186 may climb the leg and initially encounter the semisolid bait received by support surfaces 196 followed, possibly, by any residual baits on the inner wall 200 of body 190. Ultimately, the pest falls into the cup 198 where it may consume additional bait or adhere to a glueboard.

Figure 28:
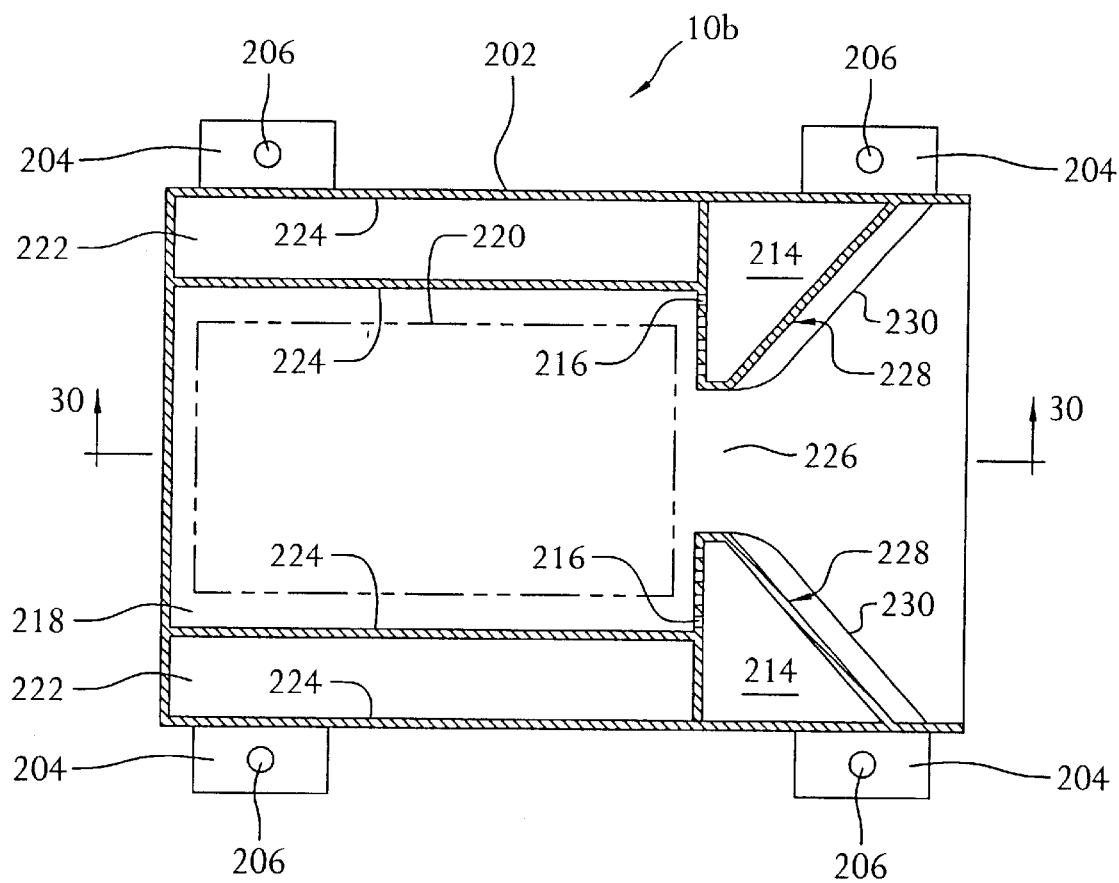
FIG. 28 is a side elevation view of a further embodiment of a pest control device according to the present invention with a cover thereof omitted for clarity of illustration.
Figure 29:
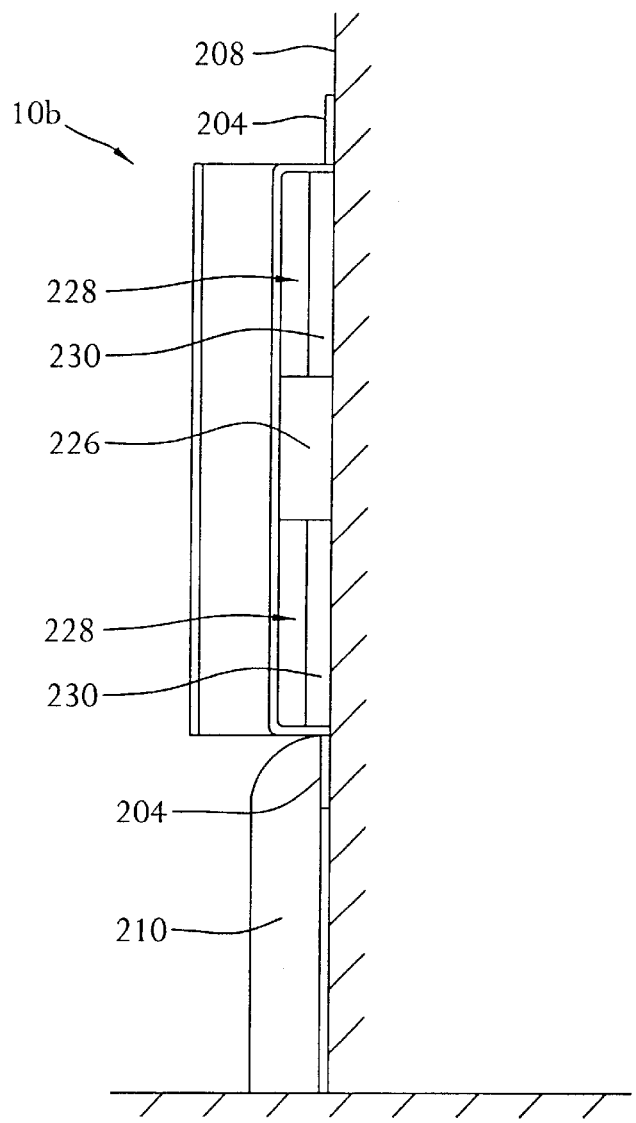
FIG. 29 is an end elevational view of the pest control device of FIG. 28 disposed adjacent a baseboard.
Figure 30:
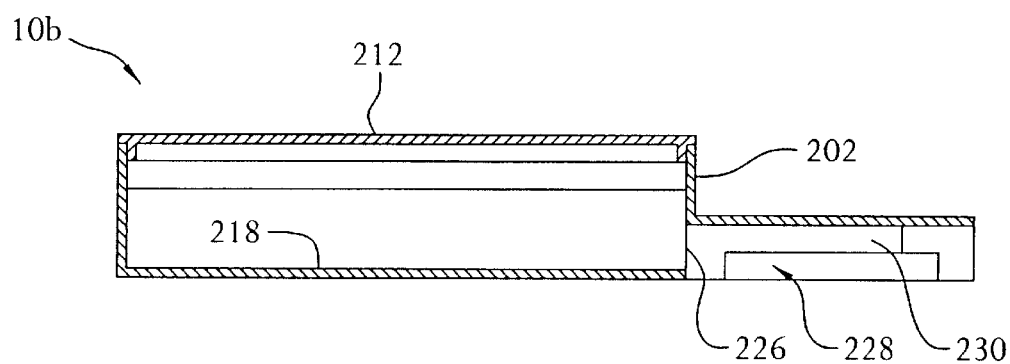
FIG. 30 is a cross-sectional view taken along line 30—30 of FIG. 28.

FIGS. 28, 29 and 30 depict several views of a further ground crawling pest control device according to the invention identified by reference numeral 10b which is especially adapted for accommodating the downward wall movement and baseboard tracking effect of certain ground crawling pests. Device 10b includes a housing 202 plurality of tabs 204 having openings 206 for receiving unillustrated screws, nails or similar means for securing the device to a substantially planar surface such as the vertical wall surface 208 shown in FIG. 29. As also shown in that figure, tabs 204 may also be slid behind a baseboard 210.

As shown in FIG. 30, housing 202 is enclosable by a removable cover 212 which allows the user to place baits or related pest control materials and/or glueboards in several chambers provided in the housing 202. The first of these chambers includes at least one an ant-specific chamber 214 and adapted to receive granular or paste baits having holes 216 sized to accommodate ants to the substantial exclusion of other ground crawling pests. At least one second chamber 218 may be sized to receive a glueboard 220 (shown in dot-dash line) or roughened to enhance retention of residual baits which may be sprayed, brushed or otherwise applied thereto. And, the at least one third chamber 222 includes at least one support surface 224 for receiving granular or semisolid materials.

Device 10b further preferably includes a funnel-like entrance 226 defined by a pair of opposed ramps 228 which may include optional raised support surfaces 230 for semisolid baits. The housing 202 and chambers 214, 218 and 222 are preferably symmetrically arranged such that the device 10b may be inverted to best fit with the wall and baseboard assembly adjacent which it is to be used.

Figure 31:
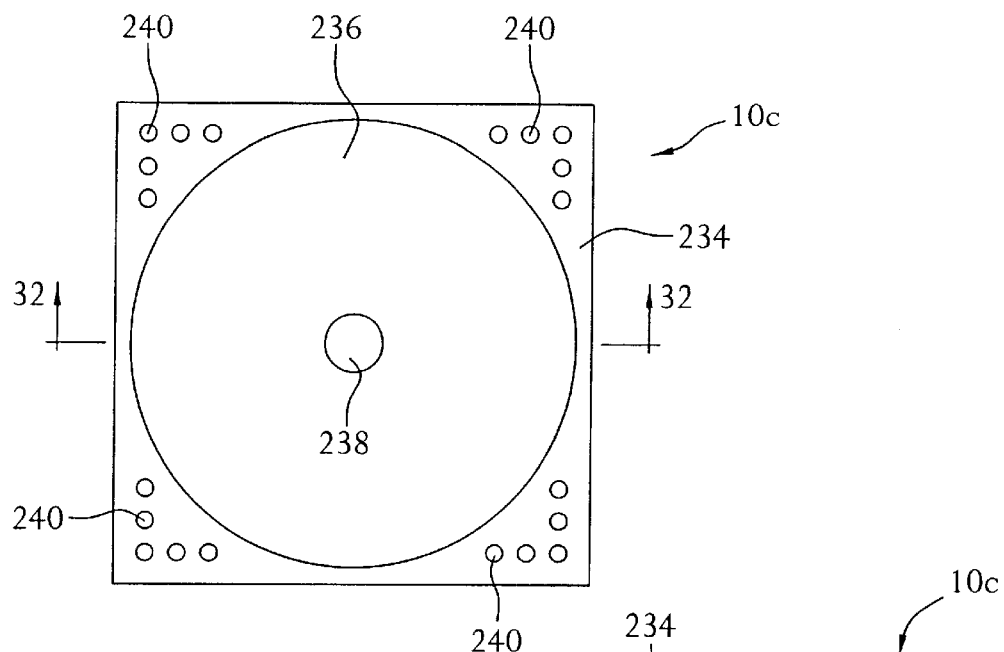
FIG. 31 is a top plan view of a further embodiment of a pest control device according to the present invention.
Figure 32:
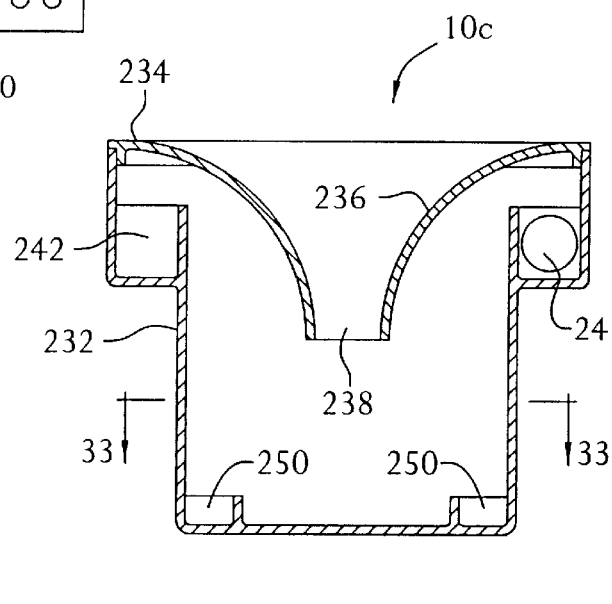
FIG. 32 is an elevational cross-section view taken along line 32—32 of FIG. 31.
Figure 33:
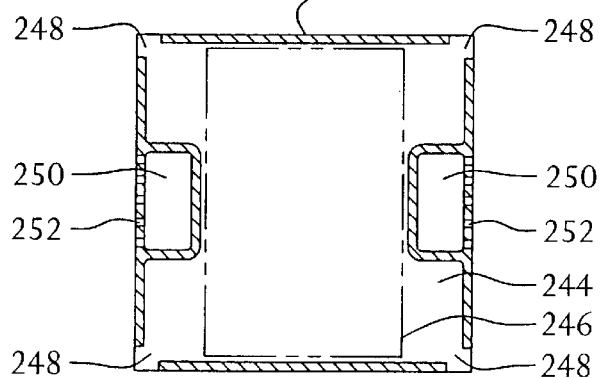
FIG. 33 is a horizontal cross-section view taken along line 33—33 of FIG. 32.

FIGS. 31, 32 and 33 are various view of another ground crawling pest control device according to the present invention. The device, identified generally by reference numeral 10c, is particularly adapted for capturing fleas and other ground crawling pests. The device comprises a base 232 and a removable cover 234. The cover preferably includes a central funnel-shaped portion 236 which terminates in a central opening 238. As illustrated in FIG. 31 the cover is preferably perforated by a plurality of holes 240 for permitting release of pheromones, growth regulators, heat, carbon dioxide, heat and/or light which emanate from sources of same received in one or more compartments 242 (FIG. 32).

The floor 244 of base 232 is preferably of suitable dimensions to receive a glueboard 246 (shown in dot-dash line in FIG. 33). As also shown in that figure, the upstanding walls of base 232 preferably include at lease one opening 248 for permitting entry into the device of ground crawling pests larger than ants. The interior of the base 232 is also preferably provided with one or more chambers 250 for receiving granular or liquid pest control materials. The walls of the base 232 are preferably perforated by holes 252 adjacent chambers 250 which are sized to accommodate ants to the substantial exclusion of other ground crawling pests.

Although grouped herein with other ground crawling pests, adult fleas move by jumping rather than crawling. Fleas are attracted to the aforementioned attractants contained in compartments 242 and jump to gain access to the attractants. The large funnel-shaped portion 236 receives the jumping flea and, upon contact therewith, the flea slides down the wall of the funnel through opening 238 and becomes entrapped on glueboard 246.

Figure 34:
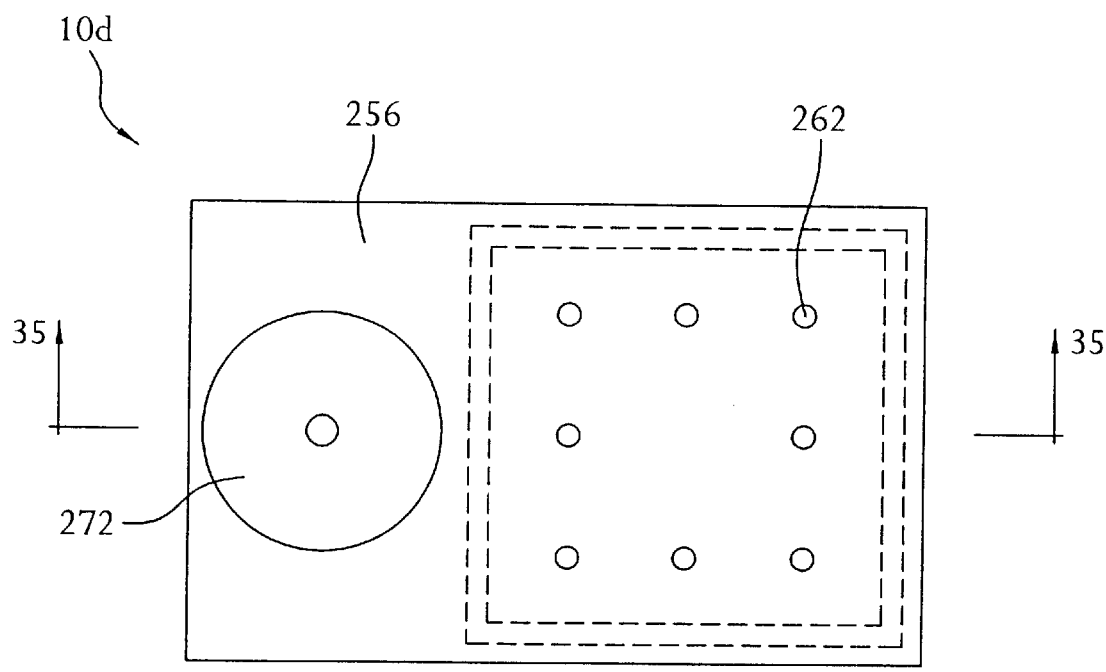
FIG. 34 is a top plan view of a further embodiment of a pest control device according to the present invention.
Figure 35:
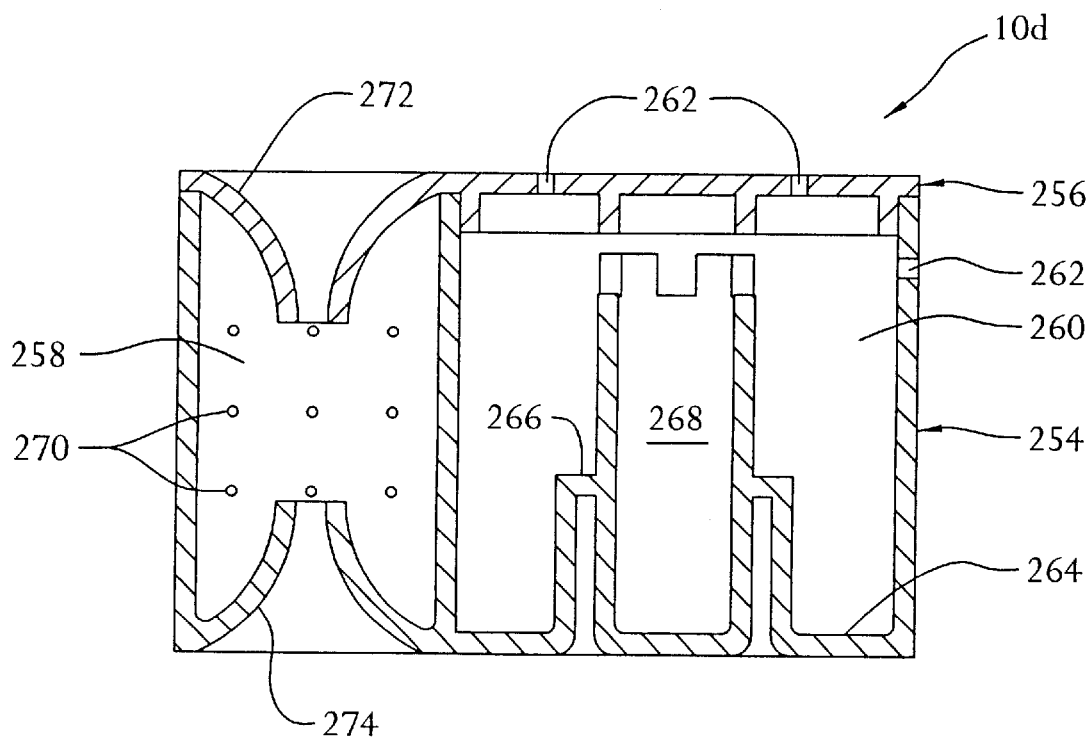
FIG. 35 is an elevational cross-section view taken along line 35—35 of FIG. 34.

FIGS. 34 and 35 illustrate a further pest control device according to the invention identified generally by reference numeral 10d. Device 10d is adapted for control of flying pests such as ladybugs which are capable of landing and walking and other species of ground crawling pests. Device 10d preferably comprises a base 254 and a removable cover 256 which separate the device into a first compartment 258 for controlling flying pests and a second compartment 260 for controlling ground crawling pests, particularly ants.

Preferably, the base and cover include a first plurality of holes 262 to permit ingress by ants. The interior of the second compartment includes first, second and third areas 264, 266 and 268 substantially corresponding in structure and function to the first area 92, the first additional area 100 and the second additional area 104 of base 80 described above in connection with FIGS. 13 through 16. Ants may therefore enter the second chamber through holes 262 and encounter a variety of granular, semisolid and/or bait materials that may be contained in second compartment 260.

As shown in FIG. 35, the side walls of first chamber 258 are preferably perforated by holes 270 to enable release of pheromones or other scent-based attractant contained in the chamber. The first chamber 258 further preferably includes a pair of opposed funnel portions 272, 274. So constructed, a flying insect may either fall down into or crawl upwardly into the chamber 258 and become entrapped therein when the insect attempts to again take flight and fails to exit the holes in the funnel portions by virtue of its extended and moving wings and difficulty finding the opening. Device 10d may be affixed by adhesives, suction cups or similar means 16 (not illustrated) at locations where flying insects are likely to be found such as window panes, doors and the like.

Figure 36:
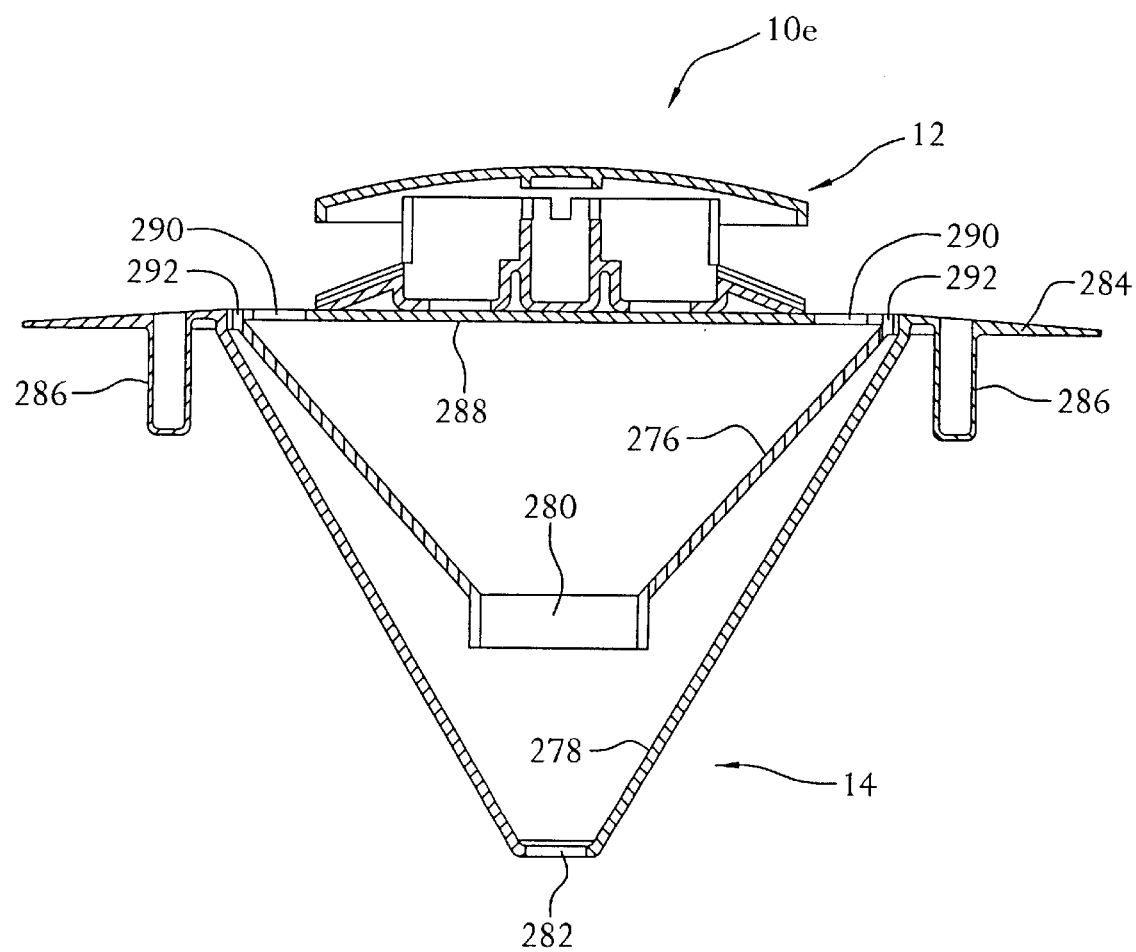
FIG. 36 is an elevational cross-section view of a further embodiment of a pest control device according to the present invention.
Figure 37:
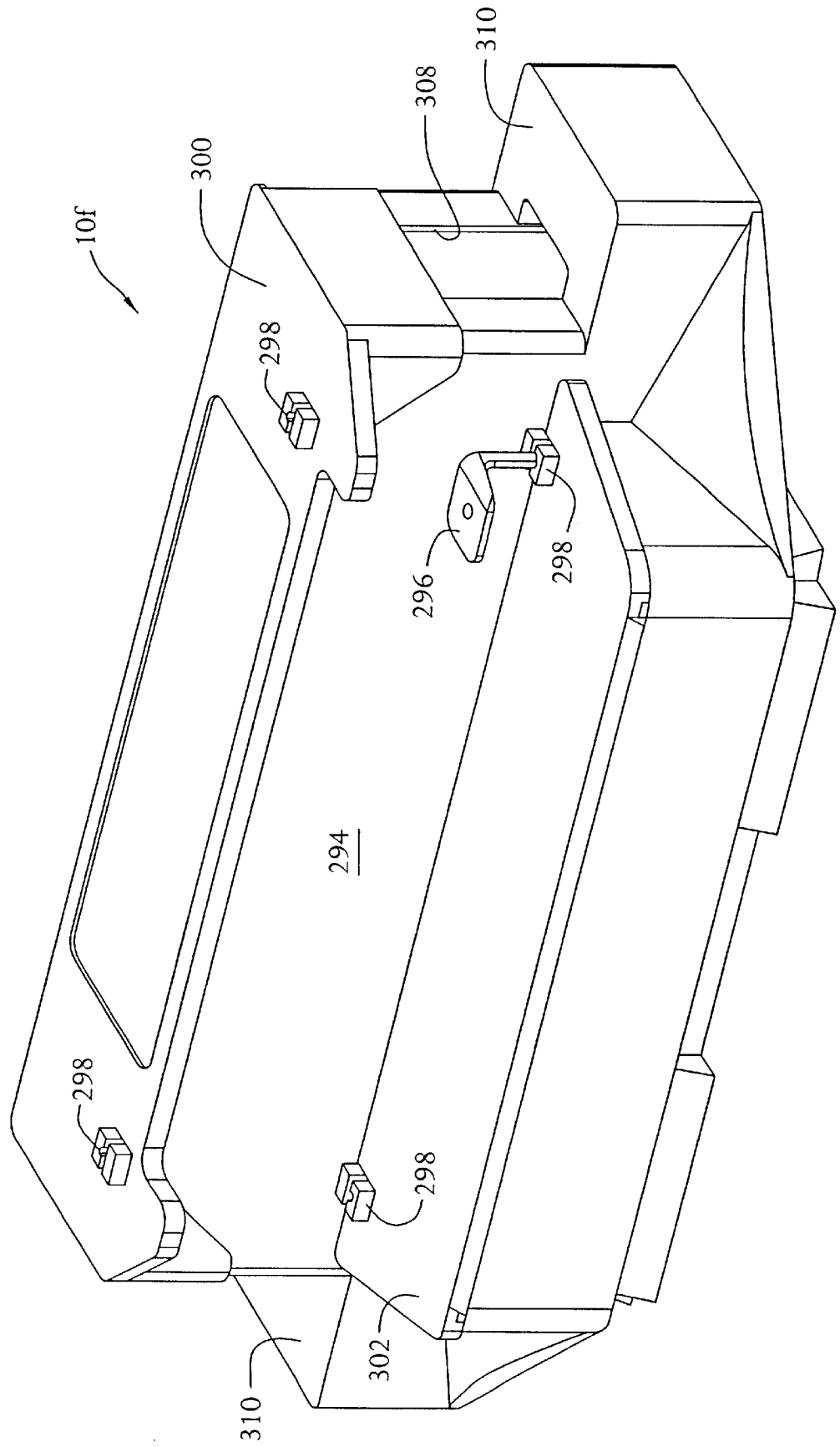
FIG. 37 is a perspective view of a further embodiment of a pest control device according to the present invention.
Figure 38:
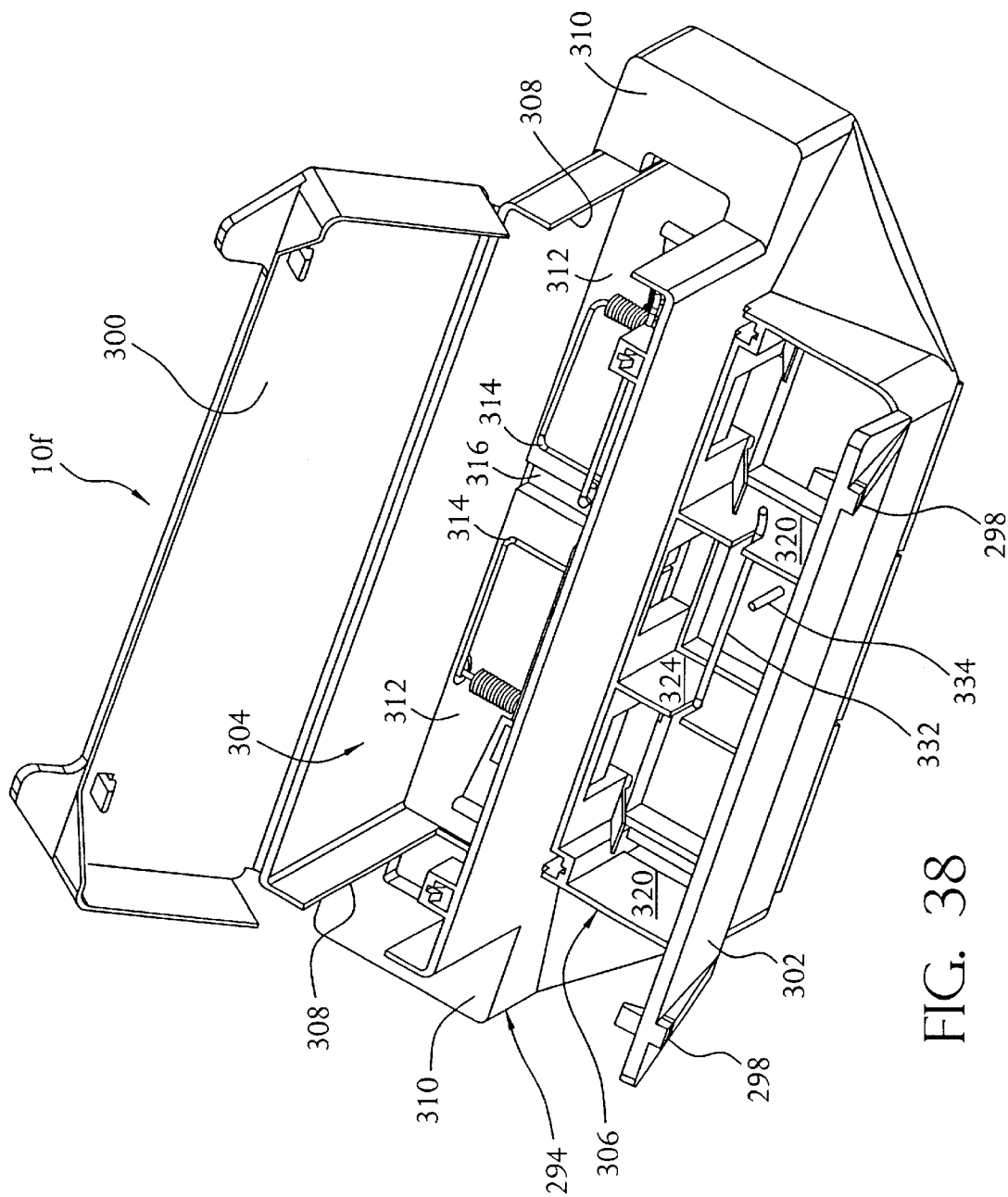
FIG. 38 is a perspective view of the pest control device of FIG. 37 with the covers thereof opened to expose the interior structures of the several internal compartments thereof.

FIG. 36 depicts a further pest control system according to the invention identified generally by reference numeral 10e. Device 10e is suited for controlling large and small ground crawling pests. The device preferably comprises a first component 12 and a second component 14 which may be affixed to one another or releasably connectable via resilient means such as resilient means 16 described supra. The first component 12 is constructed and functions substantially similar to the first component 12 of system 10 (FIGS. 1 and 14–21).

The second component of device 10e is preferably a pitfall trap comprising a pair of nested funnels 276, 278 having respective outlet openings 280, 282. Second component 14 is inserted into soil to a depth such that an undersurface of an outer annular rim 284 thereof comes into substantial contact with the ground surface. The rim 284 may be formed with one or more downwardly directed vials 286 for holding water or other liquid pest attractants. Hole 282 permits drainage of water from the device.

The top 288 of the pitfall trap is provided with a first plurality of large holes 290 of a size sufficient to accommodate virtually any size of ground crawling pest. Top 288 also includes a second plurality of small holes 292 sized to accommodate ants to the substantial exclusion of other ground crawling pests. Large pests enter holes 290 and slide down funnel 276 through hole 280 and into the base of funnel 278. The large pests cannot thereafter escape because, even if they successfully traverse the walls of funnel 278, they cannot exit the small holes 292. The large pests eventually die and provide an excellent attractant for ants which enter the holes 292 and feed on the dead pests. The ants so drawn to the device may also investigate the first ground crawling pest device 12 and consume any toxicants contained therein.

FIGS. 37, 38, 39 and 40 illustrate a further pest control device according to the invention identified generally by reference numeral 10f. Device 10f is designed to control at least one species of rodent and at least one species of ground crawling pest. Because device 10f may contain rodenticidal materials in one or more areas thereof, which materials are especially toxic to humans, the interior of housing 294 of the device is preferably accessible only by inserting an appropriate key-like release tool 296 into a plurality of lock or latch mechanisms 298 provided in a pair of pivotally mounted access covers 300, 302. Covers 300, 302 permit the user selective access to a first substantially enclosed compartment 304 for controlling rodents and at least one additional second substantially enclosed compartment 306 for controlling at least one of ground crawling pests and rodents.

The first compartment includes at least one opening 308 for permitting ingress by rodents. Rodent ingress opening(s) 308 may be sized and shaped to accommodate any desired species of rodent.

Because rodents have the ability to investigate and/or free themselves from existing trapping devices, the present invention incorporates means to effectively ensure entrapment. Such means comprises a launch surface 310 disposed in advance of each opening 308 which is sufficiently distant from the trapping means to prevent the rodent from probing the interior of the compartment 304 with its front paws while retaining contact by its rear paws with the exterior of the compartment. With the launch surface 310 sufficiently distant from the trapping means in the compartment 304, the curious rodent must "commit" and leap with all four legs into the compartment and thereby be ensnared by suitable trapping means. The distance of the launch surface 310 from the trapping means will, of course, vary depending on the species of rodent targeted for control by device 10f.

Figure 40:
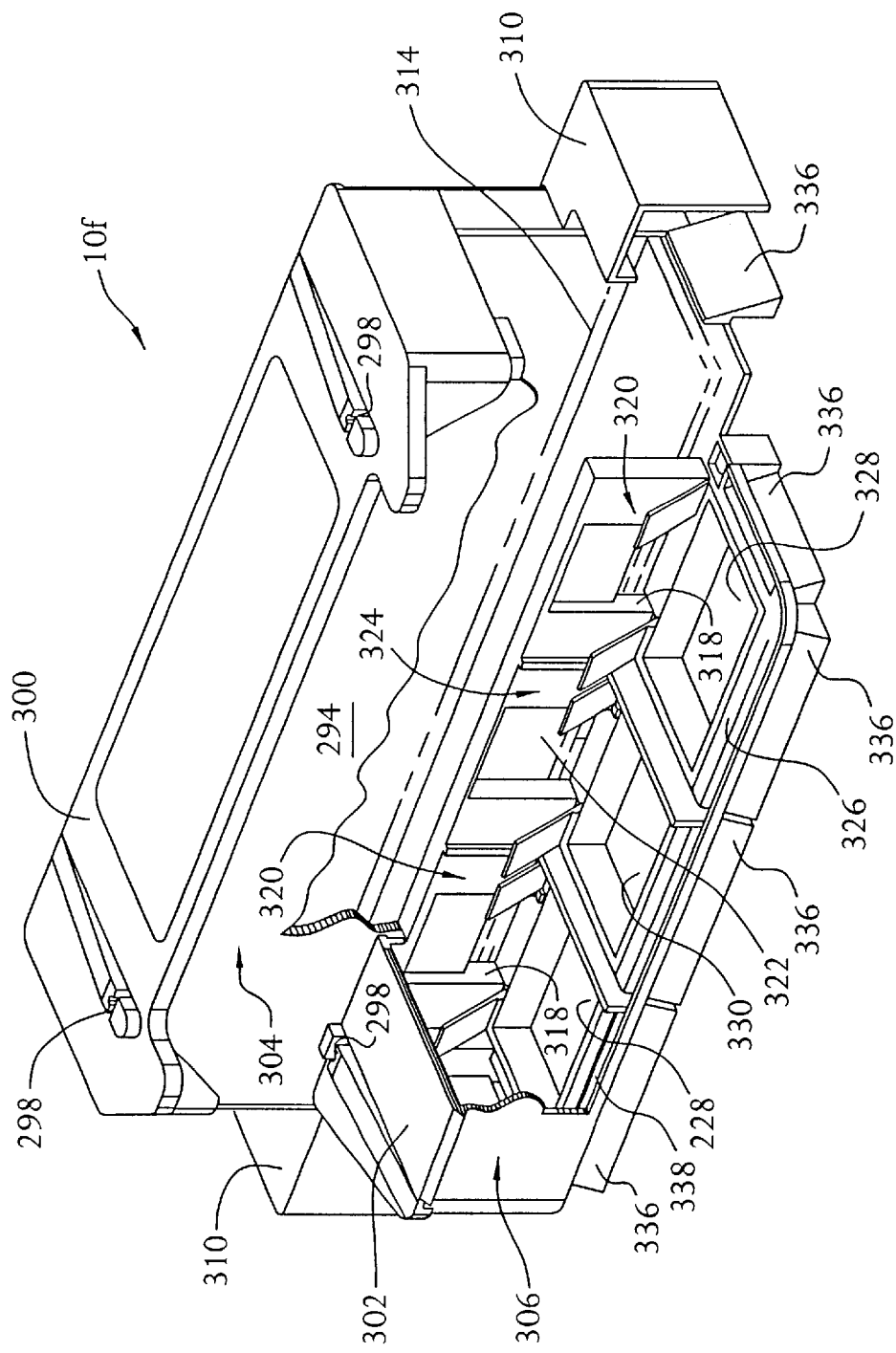
FIG. 40 is a partially cut perspective view of the pest control device of FIG. 37.

Rodent trapping means suitable for use in first compartment 304 include one or more snap traps 312 (FIG. 38) or at least one glueboard 314 (shown in dot-dash line in FIG. 40). Snap trap(s) 312 may be permanently mounted or removably mountable on first compartment 304. In the event snap traps 312 are used, the height of first compartment 304 will be sufficient to permit unrestricted swinging motion of the dead fall arms 314 from their set positions, as shown, to their trapping positions. In addition, when snap traps are grouped close to one another, the shock which occurs from the triggering of one trap may cause inadvertent triggering of an adjacent trap, thereby disabling the adjacent trap. To avoid this eventuality, device 10f desirably includes means for absorbing shock arising from triggering of one or the other of snap traps 312. Suitable shock absorbing means preferably comprise a raised partition means 316 provided on the floor of the first compartment 304 between the adjacent snap traps 312.

According to a presently preferred construction, the first compartment 304 and the at least one additional compartment 306 are desirably interconnected to permit passage of at least one of rodents and ground crawling pests therebetween. Suitable means for interconnecting the first and at least one additional compartments 304, 306 preferably include at least one opening 318 (FIG. 40) to permit passage of ground crawling pests between the first passage 304 and at least one second compartment 320 for controlling ground crawling pests, and at least one opening 322 to permit passage of rodents between the first compartment 304 and at least one third compartment 324.

Figure 41:
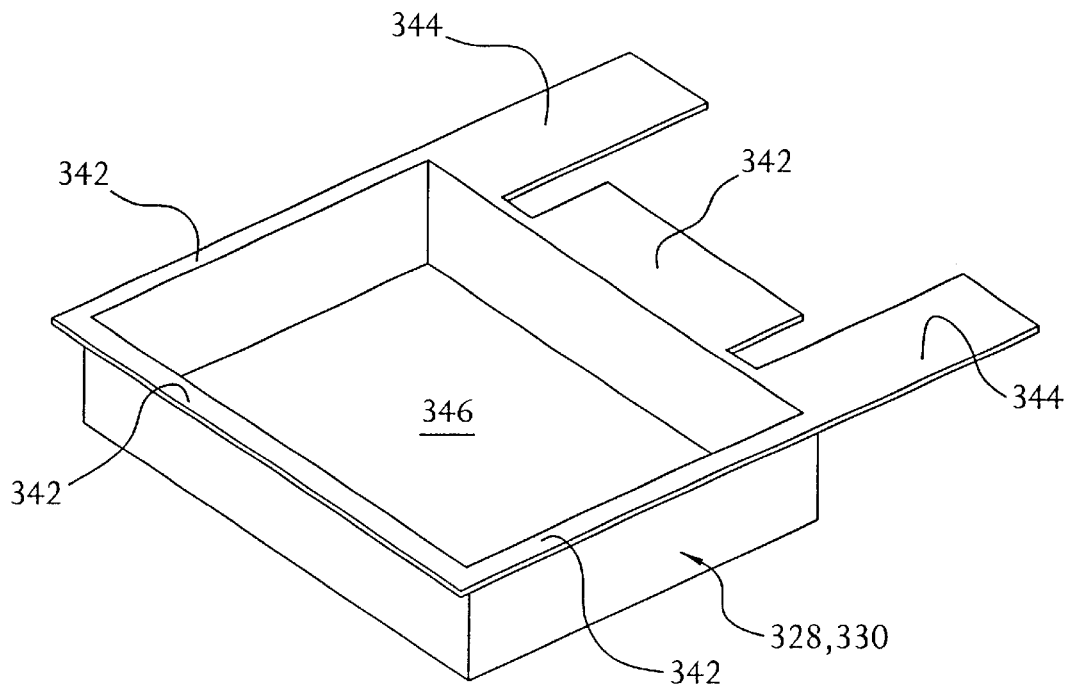
FIGS. 41 and 42 are perspective views of removable trays for receiving pest control material and disposable in the pest control device of FIG. 37.
Figure 42:
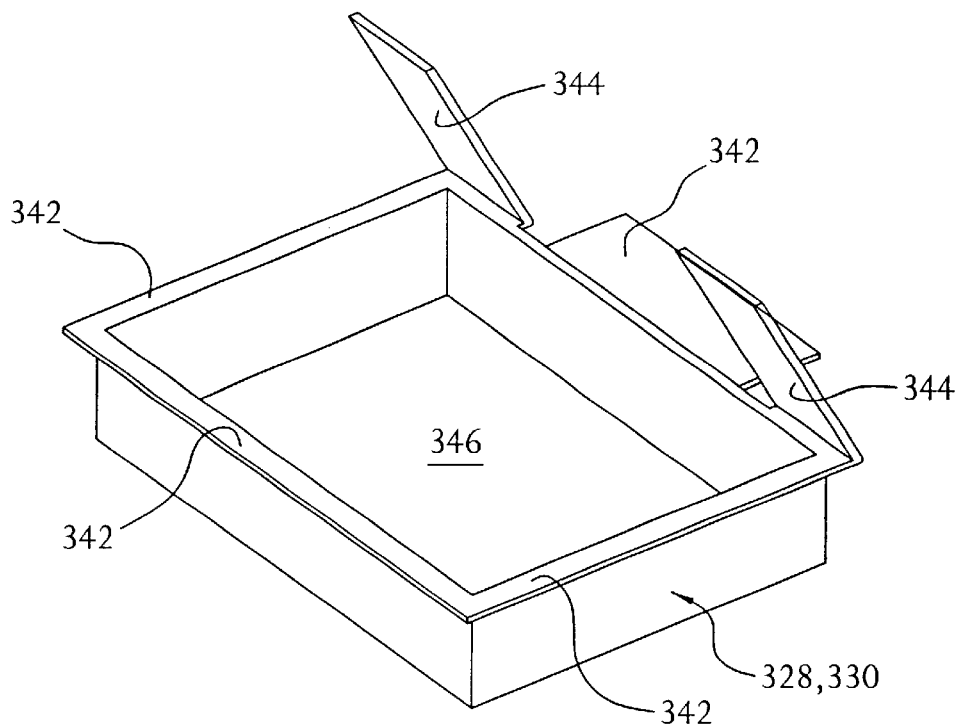

The at least one second compartment 320 includes a first area 326 having a first construction for receiving a first pest control material having a first physical consistency, e.g., a support surface for receiving semisolid material. The at least one second compartment 320 includes at least one additional area having at least one additional construction substantially different from said first construction for receiving at least one additional pest control material having at least one physical consistency substantially different from the first physical consistency. For instance, the at least one additional area preferably comprises a tray 328 for receiving granular and/or liquid pest control material. The at least one third compartment 324 preferably includes a similar tray 330 for receiving a third pest control material, e.g., a rodenticidal bait material. Trays 328, 330 are preferably removable and the presently preferred constructions thereof are depicted in FIGS. 41 and 42 discussed below. And, the third compartment preferably further includes at least one of a wire 332 and a post 334 (FIG. 38) for supporting the rodenticidal bait material in such fashion as to resist removal and hoarding of the bait material by rodents that encounter the bait material.

Figure 39:
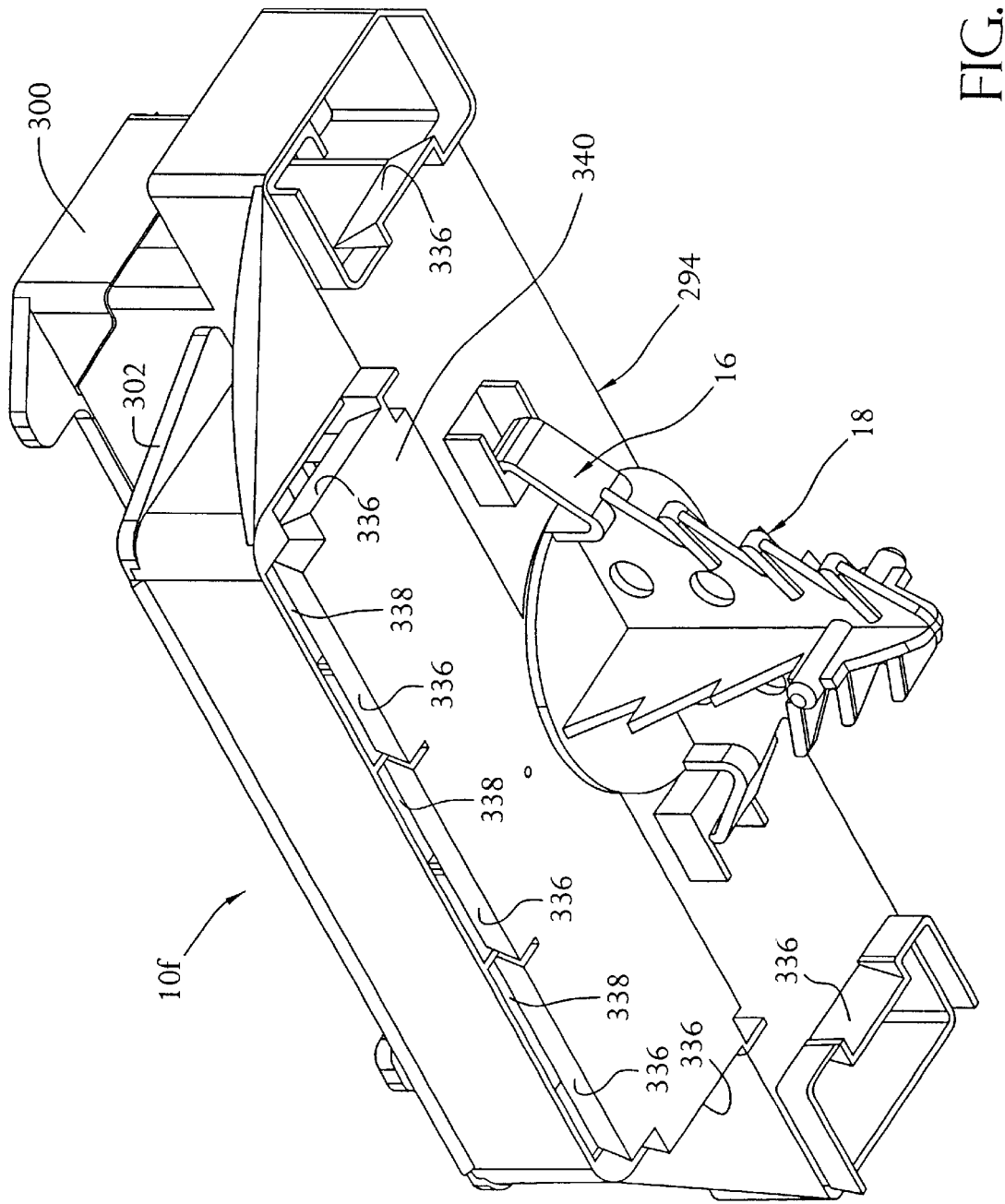
FIG. 39 is a bottom perspective view of the pest control device of FIG. 37 shown attached to a soil anchor, whereby the pest control device and soil anchor constitute first and second components of a further embodiment of a modular pest control system according to the present invention.

As most clearly shown in FIGS. 39 and 40, at least one of the first compartment 304 and the at least one additional compartment 306 comprise ramp means 336 for permitting ingress of ground crawling pests into the device 10f. The at least one additional compartment 306 further comprises means for restricting access via the ramp means 336 to ants and other small ground crawling pests. Such access restricting means preferably comprise a gap 338 having a width of between about 1/64 to about 3/8 inch.

As revealed in FIG. 39, device 10f may be releasably attachable to a soil anchor such as anchor 18 described above via resilient means 16 for soil installations. Alternatively, the undersurface of the undersurface of the housing 294 preferably includes at least large flat area 340 to receive double sided tape or similar adhesive means (not shown) for firmly but removably securing the device to an indoor floor or the like.

FIGS. 41 and 42 illustrate on an enlarged scale a presently preformed construction of removable trays 328, 330 suitable for use in device 10f. The trays may be fabricated from polyethylene, polypropylene or other suitable moldable plastic material. The trays preferably include one or more support flanges 342 for placement stability and tab means 344 which can be bent upwardly following molding of the trays (FIG. 42) to facilitate grasping and, therefore, placement and removal of the trays from the second and/or third compartments 320, 324 of the at least one additional compartment 306. The top portions 346 of the trays may receive liquid and/or solid pest control materials and may include partitions (not shown) to enable more than one type of material to be placed therein at one time.

Figures 43, 44:
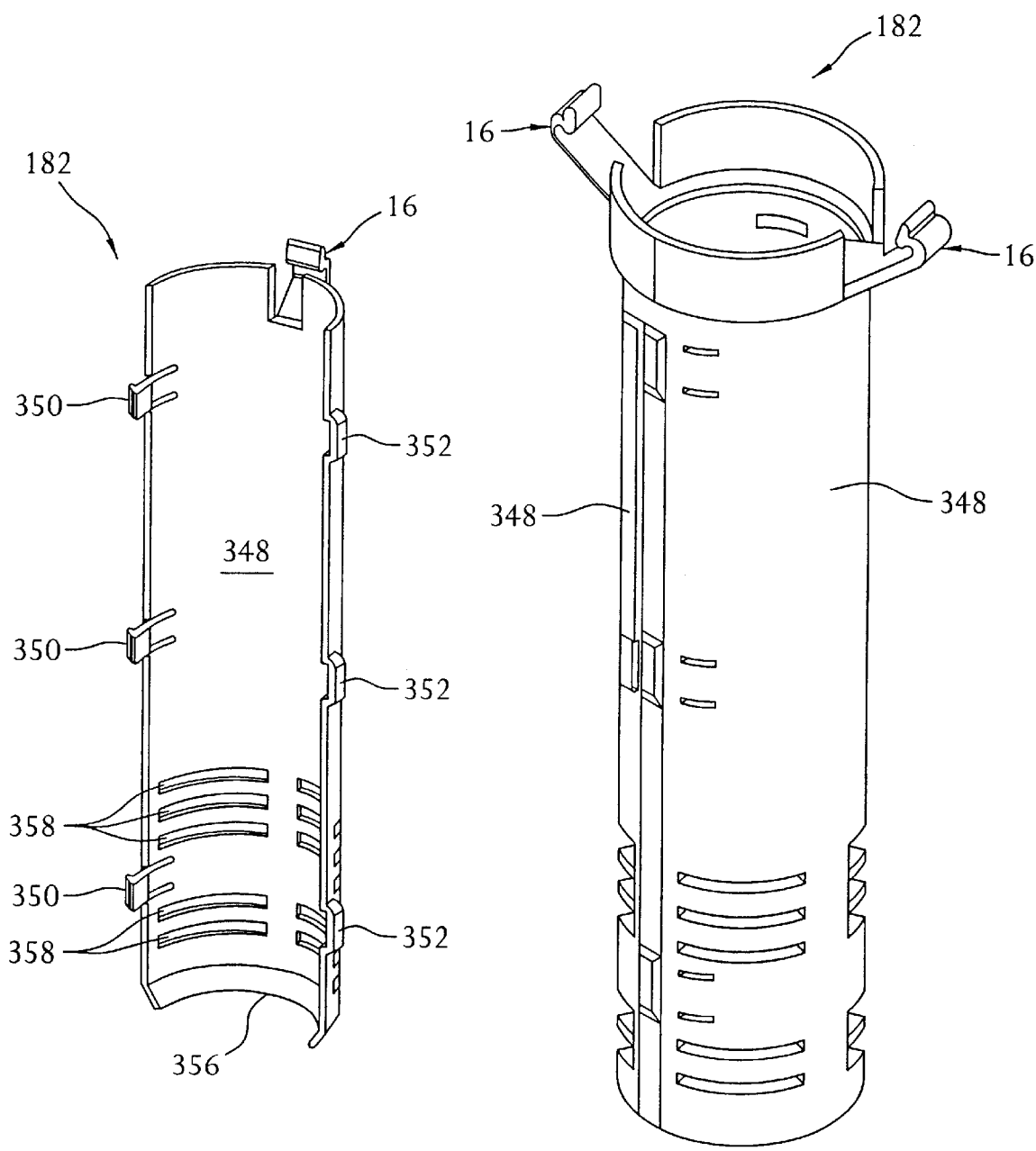
FIG. 43 is a perspective view of a termite tube housing section according to the present invention.
FIG. 44 is a perspective view of a pair of the termite tube housing sections of FIG. 43 joined to form a completed subterranean termite tube housing.

FIGS. 43 and 44 reveal structural details of a presently preferred subterranean termite tube 182 constructed in accordance with the present invention. Tube 182 is preferably fabricated from high-impact, UV modified polypropylene or other suitable substantially rigid material. It is preferably constructed as a pair of elongate, substantially semicylindrical, mirror-image housing members 348 which are unitable awith one another to assume the tube construction shown in FIG. 44. Suitable means for joining the housing members 348 include a plurality of resilient latch fingers 350 adapted for releasable engagement with corresponding detents 352, whereby the fingers 350 of one housing member releasably engage with the detents 352 of the other housing member. The bottom of each housing member 348 is preferably open as at 356 to facilitate ingress of termites therein. At least the lower portion of each housing member desirably includes a plurality of openings 358 to provide additional opportunities for termite access. And, the top of the tube 182 is preferably provided with resilient means 16 whereby it may anchor and be releasably securable to a first pest control component 12 in the manner shown in FIG. 26.

Figures 45, 46:
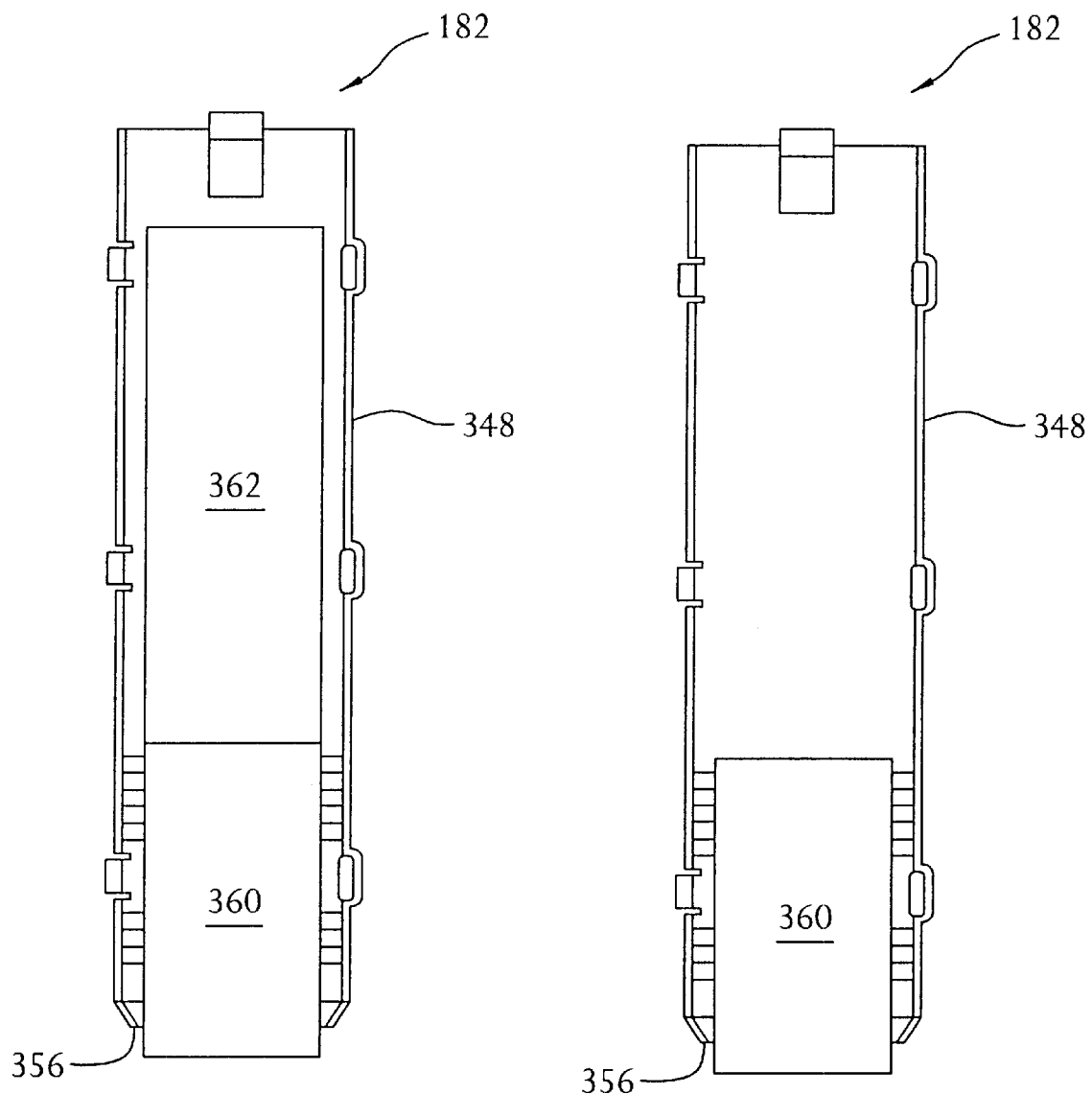
FIGS. 45 and 46 are elevational views of the structure and manner of operation of a subterranean termite control device according to the present invention.
Figure 47:
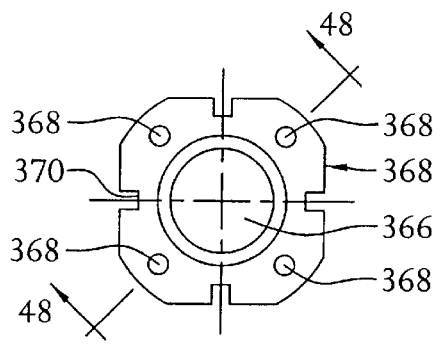
FIG. 47 is a top plan view of a substantially rigid termite control material according to the present invention suitable for use in a subterranean termite tube.
Figures 48, 49:
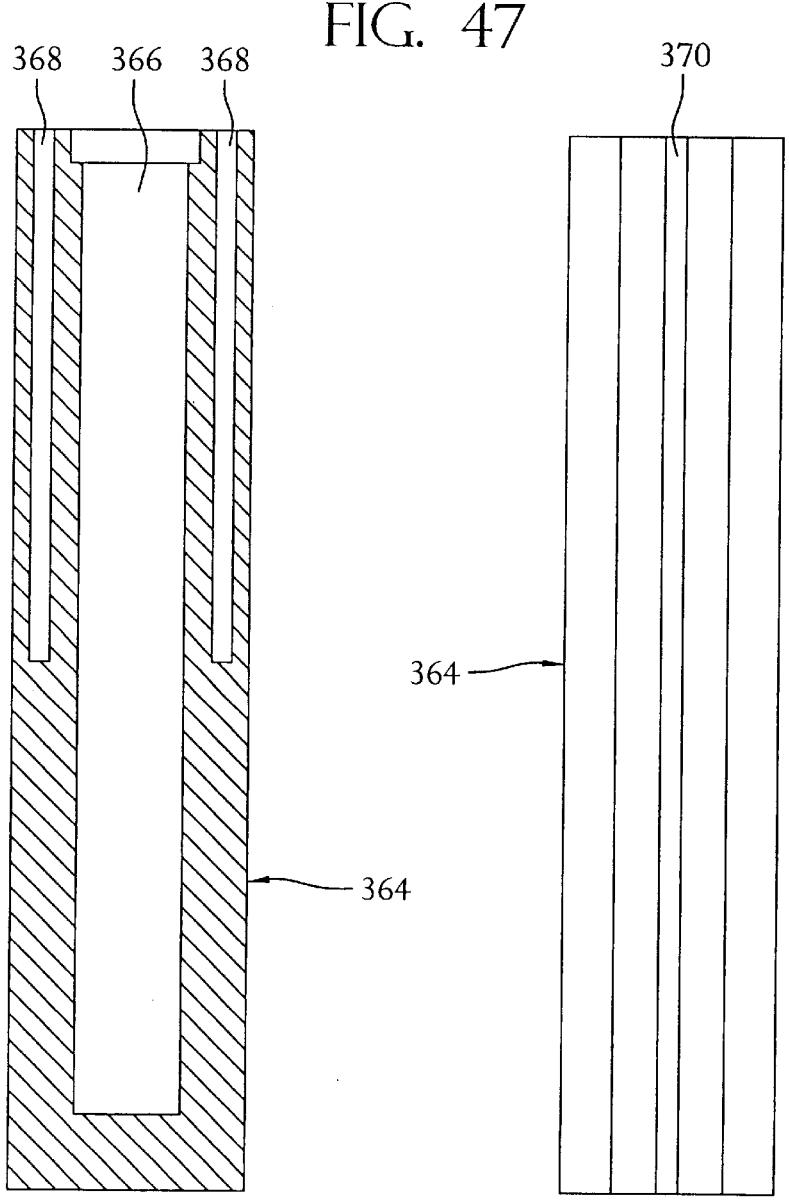
FIG. 48 is an elevational cross-section view taken along line 48—48 of FIG. 47.
FIG. 49 is an elevation view of the exterior of the termite control material of FIG. 47.
Figure 50:
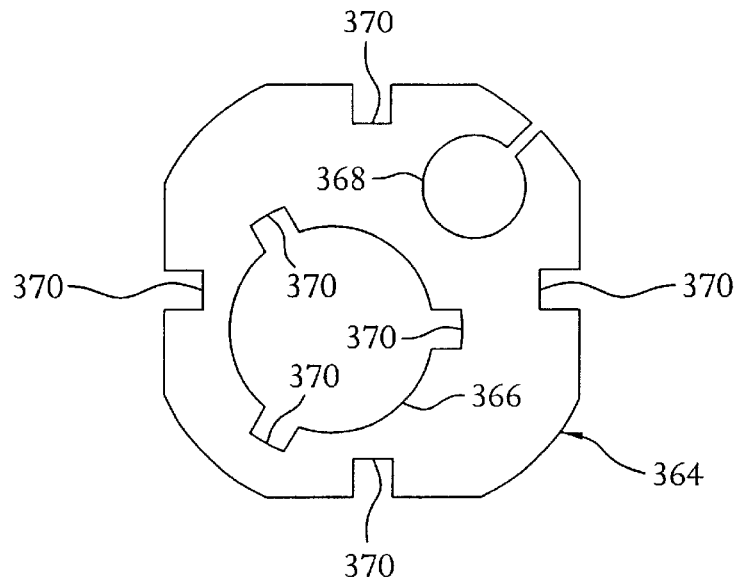
FIG. 50 is a top plan view of a further embodiment of a substantially rigid termite control material according to the present invention suitable for use in a subterranean termite tube.

FIGS. 45 and 46 illustrate a first preferred application of the termite tube 182. As seen in FIG. 45 a pair of pieces of substantially rigid pest control material 360 such as blocks of soft woods, e.g., spruce, fir, pine or the like, are disposed end-to-end with respect to one another. According to this embodiment the blocks 360, 362 should be unattached to one another and unattached to either of the housing members 348. Additionally, the lower block 360 should project from the bottom 356 of the housing members 348 such that it contacts the soil and absorbs moisture, thereby rendering it more attractive to termites.

The disconnected arrangement of blocks 360 and 362 allows tubing, the creation of galleries and similar evidence of termite activity to occur in the tube 182 without requiring disruptive inspection which after causes termites to leave existing termite monitoring systems known in the art which distorts the accuracy of the monitoring process. That is, by being disconnected from one another, the user may gently slide the upper block 362 out of the tube 182 as shown on FIG. 46. and examine it while leaving the lower block 360 in place, hence allowing the termites therein to continue their tunneling and tubing activities with little on or no disturbance. The user may then gently replace the block 362 or substitute it with a similarly shaped block coated or impregnated with a suitable termiticidal bait material. Unlike existing termite monitoring/baiting stations wherein the monitoring material is completely removed and replaced by the baiting material which causes considerable disruption of the nest, the present invention allows some of the monitoring material to remain in situ and undisturbed throughout the monitoring process, thereby improving the integrity and accuracy of the process. Additionally, either or both of blocks 360, 362 may be provided with at least cavity (not shown) to further promote termite activity therein.

FIGS. 47, 48, 49 and 50 represent several views of a termite control material 364 according to the present invention which suitable for use in termite tube 182 or similar such tubes heretofore known in the art. Termite control material 364 is preferably fabricated from substantially rigid foam material such as expanded polystyrene, or the like. Such materials are frequently used as insulation in building construction. When used as such, these materials have been demonstrated a propensity for infestation by termites. Clearly, such materials are insulative and thus may serve as shelter, but they also tend to release gases such as carbon dioxide gas which may serve as an intoxicant-type attractant to termites. Rigid foams last longer than wood because of their inherent resistance to rot and decay and are therefore especially advantageous for use as termite control material.

Other benefits of such materials, from a manufacturing perspective, are that they are generally inexpensive, can be easily formed with features that attract termites and can be readily impregnated with termicidal agents. For instance, they may be formed with cavities such as large central cavity 366 which can increase the surface area for termite activity and visual inspection. Smaller cavities 368 may also be provided to hold attractants such as water to further stimulate termite activity. The cavities 366, 368 may extend entirely through the foam material 364 or, as illustrated, only partially therethrough. They can assume any relative size, number and arrangement; compare, for example, FIGS. 47 and 50. They can be used to store food such as sawdust, wood or wood byproducts as additional attractants or replaceable vials, sponges or wicks for retaining water or other liquid. Furthermore, if sufficiently large in diameter, any of the cavities 366, 368 as well as the outer peripheral wall of the foam material may be provided with grooves, slots or similar formations 370 for further stimulating termite activity in the foam.

Grooves 370 may assume essentially any cross-sectional configuration but should range from about ⅛ to about ½ inch in depth and width to provide attractive and ideal termite tubing surfaces.

Figure 51:
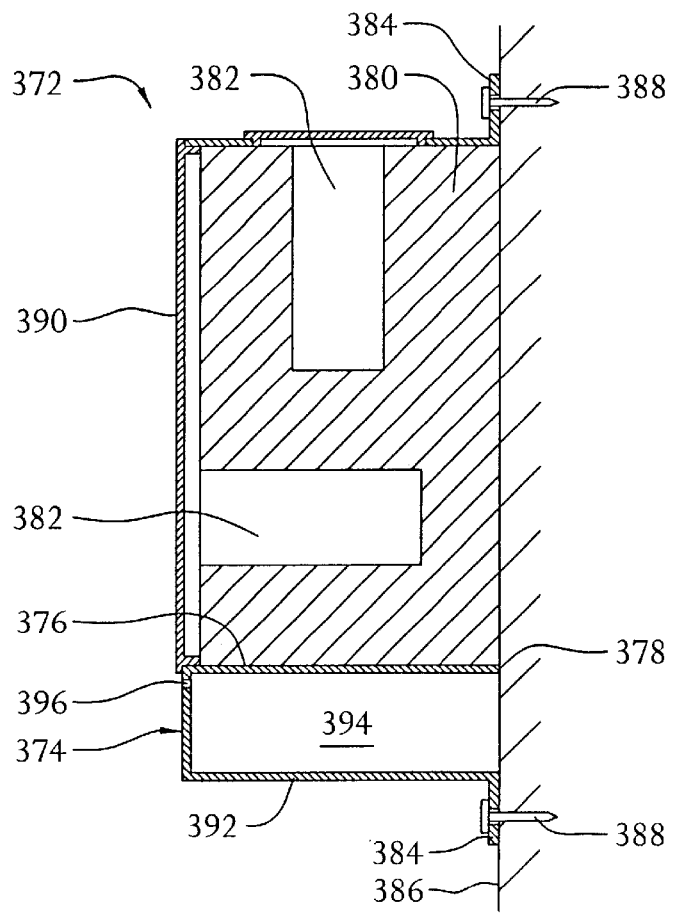
FIG. 51 is an elevational cross-section view of a further embodiment of a termite control device according to the present invention.

FIG. 51 illustrates a further termite control device according to the invention identified generally by reference numeral 372. Device 372 includes a housing 374 defining a pocket 376 and on open side 378. A substantially rigid termite control material 380 is provided in the pocket 376 and may include any of the wood or foam materials described above. The material 380 may include one or more cavities 382 for holding any suitable food, water and/or bait attractants.

Housing 374 further includes means in the form of perforated tabs 384 or the like for securing the housing to termite damaged wood 386 via nails, screws or similar fasteners 388. The housing is disposed such that the open side 378 faces the termite damaged wood 386 and the termite control material 380 is in substantial contact with the termite damaged wood. Housing 374 further preferably includes a removable cover 390 for permitting access to the pocket 376 without detaching the device 372 from the termite damaged wood. Optionally, the housing 374 may have an outer wall 392 defining a chamber 394 formed interiorly of the wall for receiving a liquid pest control material such as water through an opening 396. Alternatively, the liquid material may be retained in chamber 394 via an unillustrated sponge or wick.

Figure 52:
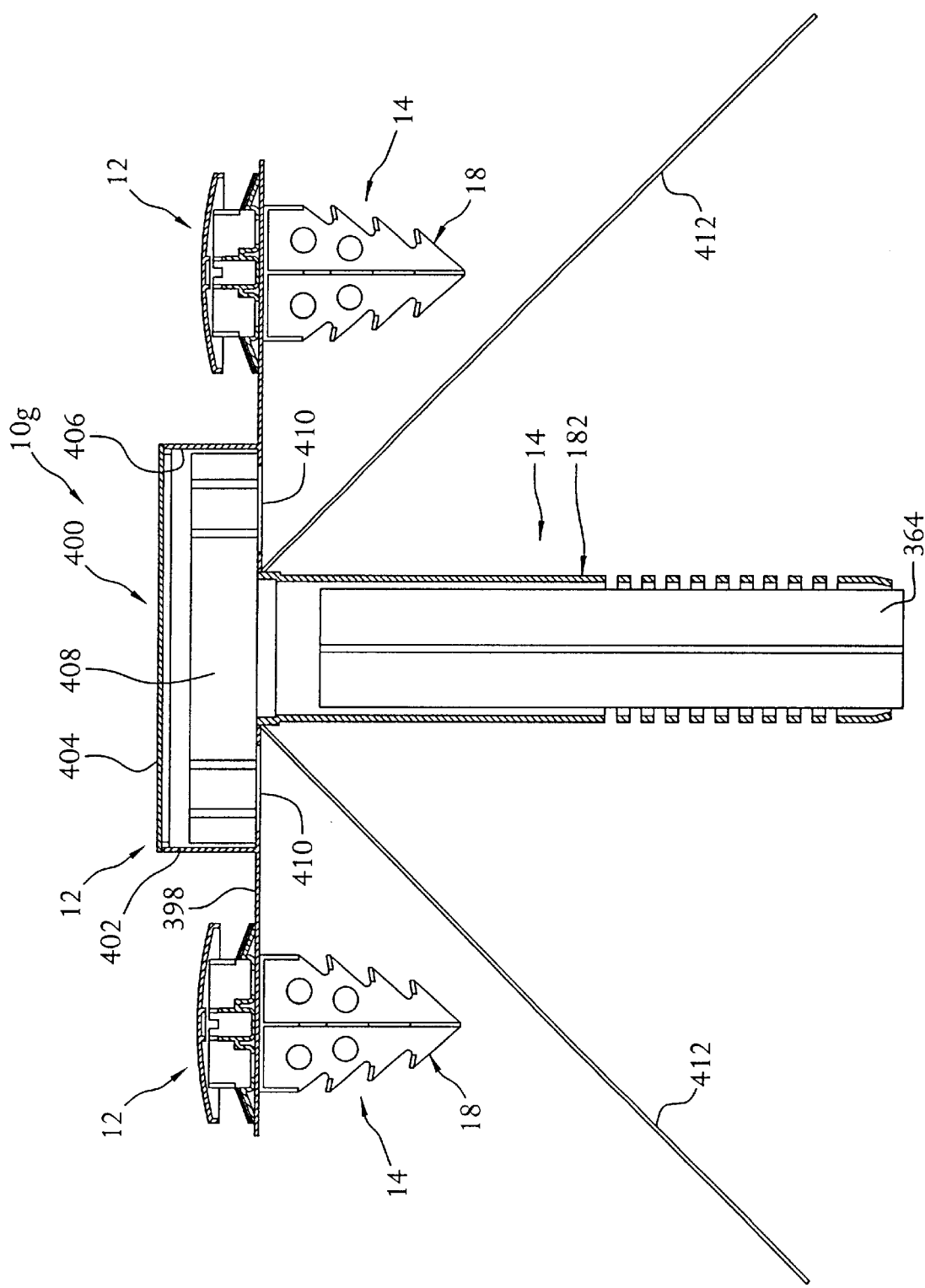
FIG. 52 is an elevational cross-section view of a further embodiment of the modular pest control system according to the present invention.

FIG. 52 reveals a further presently preferred modular pest control system according to the present invention identified generally by reference numeral 10g. System 10g may include several of the aforedescribed first and second components 12, 14 such as the ground crawling pest control device illustrated in FIGS. 13 through 21, the soil anchor 18 of FIG. 1 and/or the subterranean termite tube 182 of FIGS. 43 and 44 (including foam material 364).

In addition, FIG. 52 reveals further features of the invention which may be used alone or in combination with any of the other components or elements thus far described. For example, the several first components 12 of FIG. 52 may connected to a common base 398. Moreover, the centralmost first component illustrated may be a substantially horizontally oriented pest control device 400 which may include means for releasably connecting device 400 to termite tube 182. Termite control device 400 resembles a substantially inverted bowl and comprises a housing 402 of at least about 3 inches to about 18 inches or greater in length, width or diameter to produce a large ground "shadow" attractive to may pests. Housing 402 further desirably includes removable cover 404 for enabling access to a pocket 406 which may support one or more blocks 408 of substantially rigid wood or foam termite control material which may include one or more of the cavities and/or slots discussed hereinabove in connection with FIGS. 47 through 50. Common base 398 includes one or more openings 410 to permit ingress of termites into device 400.

Because of the above-described cable effect, many ground crawling pest and termites tend to travel along the upper surfaces of pipes, cables, hoses and the like whether disposed at or beneath the ground surface. Device 10g accommodates this pest movement behavior characteristic through the provision of at least one substantially cylindrical trackway means 412. the trackway means 412 may be attached to one or more of the pest control devices illustrated in FIG. 52 and project therefrom in any desired direction and at any desired angle.

The trackway means may be flexible, semirigid or rigid any may comprise rods, tubes, wires, cords or strings. Suitable materials for trackways 412 may include rigid or bendable metals and plastics and other natural or artificial materials.

Figure 53:
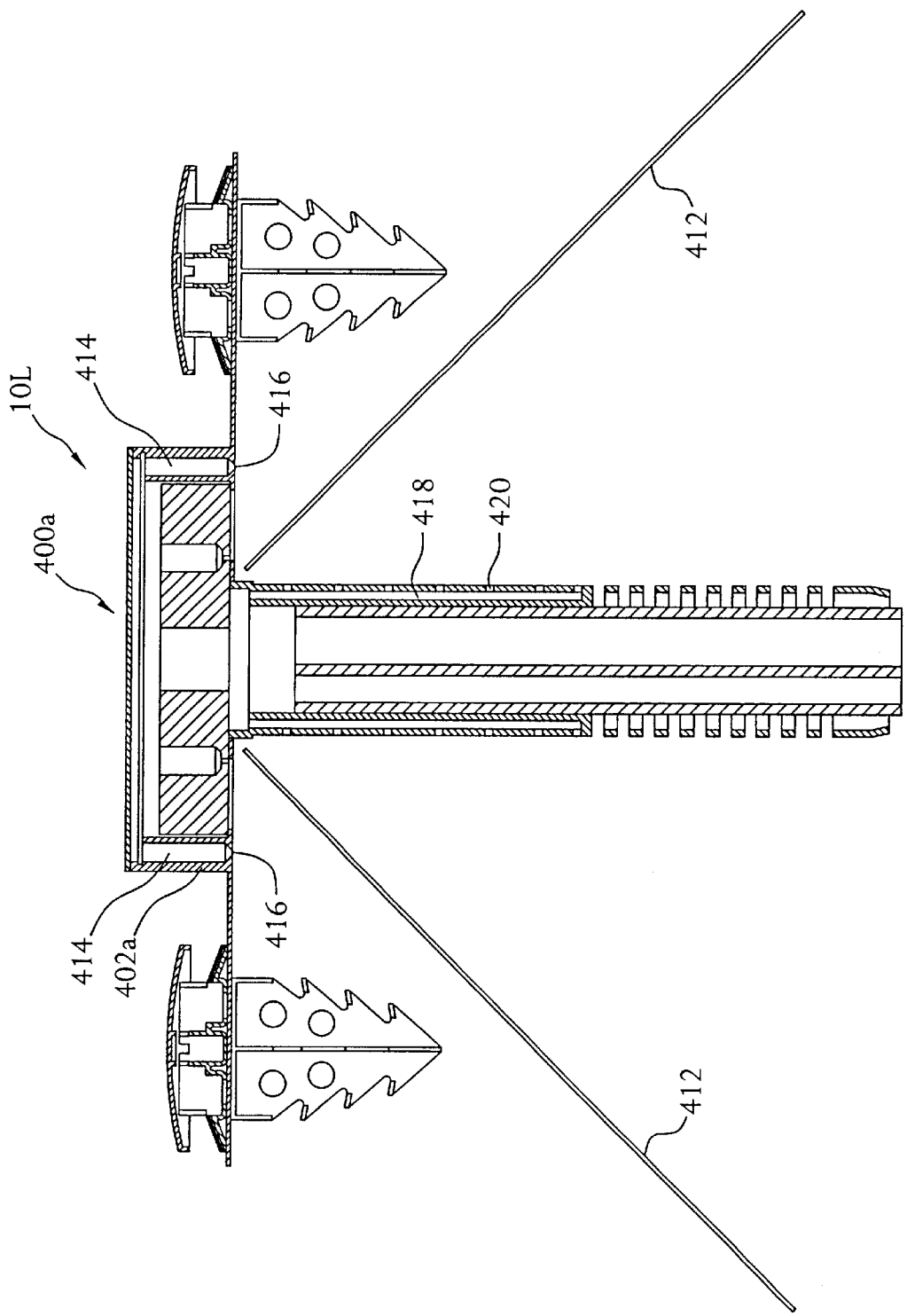
FIG. 53 is an elevational cross-section view of a further embodiment of the modular pest control system according to the present invention.

FIG. 53 reveals a further modular pest control system according to the invention, identified generally by reference numeral 10h, which is in many respects similar to system 10g of FIG. 52. In the system of FIG. 53, however, the substantially horizontally disposed termite control device, herein identified by reference numeral 400a includes a housing 402a having one or more internal chambers 414 for receiving water or, alternatively, bait materials for pests other than termites. The chambers may also include pest access/drip holes 416 to allow the pest attractants such as water to drain from the chambers 414 and attract pests to the area below the station. Similarly, the housing of the subterranean termite tube 182 may include water or similar pest attractant chamber means 418 and drip holes 420.

In addition, trackway means 412 do not have to be attached to the device to obtain the benefits of the cable effect. Accordingly, the proximate ends thereof may be spaced a short distance from the device as reflected in FIG. 53. Somewhat greater latitude may then be afforded the user in how the trackway means may be disposed with respect to the device.

It will be understood that, to the extent it may be desirable or necessary for effective pest control, any of the various elements and components disclosed herein may be used with any other such elements or components where such use is structurally and functionally feasible.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A device for controlling at least one species of pest, said device comprising:
   a first area having a first construction adapted for receiving a quantity of a first pest control material, said first construction comprising at least one chamber with at least one opening formed therein for permitting entrance into the chamber by any crawling pest; and
   at least one additional area having at least one additional construction substantially different from said first construction, said at least one additional construction comprising at least one chamber with at least one opening formed therein for permitting entrance into the chamber by only ants.

2. The device of claim 1 wherein said at least one additional area comprises a closed-bottom chamber for liquid material.

3. The device of claim 1 wherein said first area and said at least one additional area are concentrically disposed with respect to one another.

4. The device of claim 1 wherein at least one of said first area and said at least one additional area comprise a plurality of discrete zones for respectively receiving a plurality of said first pest control materials and a plurality of said at least one additional pest control materials.

5. The device of claim 1 further comprising at least one tacky surfaced pest trap configured for substantial mating placement in at least one of said first area and said at least one additional area.

6. The device of claim 1, wherein said device comprises a substantially cylindrical housing with a substantially cylindrical opening formed therein.

7. The device of claim 6, wherein the substantially cylindrical opening is adapted for receiving a substantially cylindrical member.

8. A device for controlling at least one species of pest, said device comprising:
   a first area having a first construction adapted for receiving a quantity of a first pest control material; and
   at least one additional area having at least one additional construction substantially different from said first construction, said at least one additional area being adapted for receiving a quantity of at least one additional pest control material,
   wherein said device comprises a substantially cylindrical housing with a substantially cylindrical opening formed therein, and
   wherein the substantially cylindrical opening is adapted for receiving a substantially cylindrical member, and
   wherein said substantially cylindrical member comprises a table leg.

9. The device of claim 6, wherein said first area is disposed at an upper portion of the device, and said at least one additional area is disposed at a lower portion of the device.

10. A device for controlling at least one species of pest, said device comprising:
   a first area having a first construction adapted for receiving a quantity of a first pest control material, said first construction comprising at least one chamber with at least one opening formed therein for permitting entrance into the chamber by any crawling pest; and
   at least one additional area having at least one additional construction substantially different from said first construction, said at least one additional construction comprising at least one chamber with at least one opening formed therein for permitting entrance into the chamber by only ants,
   wherein said device comprises a substantially cylindrical housing with a substantially cylindrical opening formed therein, and wherein said first area comprises at least one support surface for receiving semisolid bait.

11. The device of claim 6, wherein said at least one additional area comprises at least one upwardly turned support lip for receiving pest bait.

12. A device for controlling at least one species of pest, said device comprising:

a first area having a first construction adapted for receiving a quantity of a first pest control material; and at least one additional area having at least one additional construction substantially different from said first construction, said at least one additional area being adapted for receiving a quantity of at least one additional pest control material, wherein said device comprises a substantially rectangular housing including a substantially funnel-like entrance.

13. The device of claim 12, wherein said first area and said at least one additional area are disposed adjacent to said substantially funnel-like entrance.

14. A device for controlling at least one species of pest, said device comprising:

a first area having a first construction adapted for receiving a quantity of a first pest control material; and at least one additional area having at least one additional construction substantially different from said first construction, said at least one additional area being adapted for receiving a quantity of at least one additional pest control method, wherein said device comprises a substantially rectangular housing including a substantially funnel-like entrance, and wherein said device further comprises at least two tabs for securing the device to a wall.

15. A device for controlling at least one species of pest, said device comprising:

a first area having a first construction adapted for receiving a quantity of a first pest control material; and at least one additional area having at least one additional construction substantially different from said first construction, said at least one additional area being adapted for receiving a quantity of at least one additional pest control material, wherein said device includes a substantially funnel-shaped removable cover.

16. The device of claim 15, wherein said substantially funnel-shaped removable cover includes a central opening therein.

17. The device of claim 16, wherein said first area and said at least one additional area are disposed at a bottom portion of said device directly beneath said central opening.

18. The device of claim 1, wherein said first area is adapted for controlling flying insects and said at least one additional area is adapted for controlling ground crawling pests.

19. A device for controlling at least one species of pest, said device comprising:

a first area having a first construction adapted for receiving a quantity of a first pest control material; and at least one additional area having at least one additional construction substantially different from said first construction, said at least one additional area being adapted for receiving a quantity of at least one additional pest control material, wherein said first area includes at least one funnel-shaped opening for permitting the ingress of flying insects.

20. A device for controlling at least one species of pest, said device comprising:

a first area having a first construction adapted for receiving a quantity of a first pest control material; and at least one additional area having at least one additional construction substantially different from said first construction, said at least one additional area being adapted for receiving a quantity of at least one additional pest control material, wherein said first area includes at least one funnel-shaped opening for permitting the ingress of flying insects, and wherein said at least one additional area is disposed adjacent to said first area, said at least one additional area including holes for permitting the ingress of small ground crawling pests.

21. A pest control device, comprising:

a housing including a first area for receiving a first pest control material and a second area, said second area for receiving a second pest control material, said first area comprising a chamber with at least one opening formed therein for permitting entrance into the chamber by any crawling pest, and said second area comprising at least one chamber with at least one opening formed therein for permitting entrance into the chamber by only ants.

22. The pest control device of claim 21, wherein the housing further comprises a third area for receiving a third pest control material.

23. A pest control device, comprising:

a housing including a first area for receiving a first pest control material and a second area, said second area for receiving a second pest control material, further comprising a funnel-shaped opening for permitting ingress of pests into the pest control device.

* * * * *